(12) United States Patent
Chawla et al.

(10) Patent No.: US 12,711,440 B2
(45) Date of Patent: Aug. 18, 2026

(54) COORDINATION AT A MACHINE FOR CONSTRUCTION OBJECTIVES

(71) Applicant: Deere & Company, Moline, IL (US)

(72) Inventors: Sumit Chawla, San Carlos, IA (US); Maya Devi Sripadam, Monte Sereno, CA (US); Grant Warden, Santa Clara, CA (US); James Patrick Ostrowski, Mountain View, CA (US); Asaf Ruf, Sunnyvale, CA (US); Francois Stander, Dubuque, IA (US); Nir Rikovitch, Sunnyvale, CA (US); Benjamin R. Dow, Waukee, IA (US); Christopher Grant Padwick, Menlo Park, CA (US); Mark J. Cherney, Bettendorf, IA (US); Kent Michael Anderson, Signal Mountain, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/387,409

(22) Filed: Nov. 12, 2025

(65) Prior Publication Data

US 2026/0134375 A1 May 14, 2026

Related U.S. Application Data

(60) Provisional application No. 63/719,522, filed on Nov. 12, 2024.

(51) Int. Cl.
*G06Q 10/00* (2026.01)
*G06Q 10/0637* (2023.01)
*G06Q 50/08* (2012.01)

(52) U.S. Cl.
CPC ......... *G06Q 10/0637* (2013.01); *G06Q 50/08* (2013.01)

(58) Field of Classification Search
None
See application file for complete search history.

(56) References Cited

U.S. PATENT DOCUMENTS 10,311,444 B1 * 6/2019 Conboy ............ G06Q 30/0635
10,480,131 B1 * 11/2019 McAlpine ............ E01C 19/004
(Continued)

FOREIGN PATENT DOCUMENTS

KR 10-2663084 B1 5/2024

OTHER PUBLICATIONS

Cheng, Tao, et al. "Automated task-level activity analysis through fusion of real time location sensors and worker's thoracic posture data." Automation in Construction 29 (2013): 24-39. (Year: 2013).*
(Continued)

*Primary Examiner* — Gurkanwaljit Singh
(74) *Attorney, Agent, or Firm* — Fenwick & West LLP

(57) ABSTRACT

A vehicle moves through a construction environment and performs one or more construction actions in the environment. A master coordinator associated with the construction environment updates a global state of the construction environment based on the performed construction actions. The master coordinator may determine a plan of construction actions for machines in the environment using a generative language model and send instruction to perform the construction actions or capture data from an associated viewpoint based on the global state to the machines. Each machine may have a local coordinator that determines its local state based on sensor data and may alter actions within alteration constraints provided by the master coordinator. The master coordinator receives local states from the machines over time, updates the global state accordingly, and sends instructions to the one or more machines based on the updated global state.

20 Claims, 21 Drawing Sheets

(56) References Cited

U.S. PATENT DOCUMENTS 11,182,691 B1* 11/2021 Zhang .................... G06N 20/20
11,423,341 B2* 8/2022 Saiki ....................... E02F 9/261
2011/0153541 A1* 6/2011 Koch ..................... G06Q 10/06 706/52
2012/0136524 A1 5/2012 Everett et al.
2015/0376868 A1* 12/2015 Jackson .................... E02F 9/26 701/50
2015/0379457 A1* 12/2015 Jackson ........... G06Q 10/06398 705/7.17
2016/0300175 A1* 10/2016 Talmaki ........... G06Q 10/06315
2016/0321763 A1* 11/2016 Shike ..................... G06Q 50/08
2016/0343095 A1* 11/2016 Wei .................. G06Q 10/06398
2017/0293290 A1* 10/2017 Flir ........................ G09B 9/042
2018/0150779 A1* 5/2018 Wei ...................... G05D 1/0276
2019/0094834 A1* 3/2019 Bramberger ............. G09B 9/04
2019/0368135 A1* 12/2019 O'Donnell ............ E01C 23/088
2020/0048862 A1* 2/2020 Wei ......................... E02F 3/841
2020/0250354 A1 8/2020 Doherty et al.
2020/0332479 A1* 10/2020 O'Donnell .............. E01C 19/48
2021/0034058 A1 2/2021 Subramanian et al.
2021/0287177 A1* 9/2021 Musialek ......... G06Q 10/06312
2021/0398200 A1* 12/2021 Adato ...................... H04N 7/18
2021/0406792 A1* 12/2021 Bhardwaj .............. G06N 20/20
2023/0401348 A1* 12/2023 Mitani .................... B66C 13/48
2024/0104470 A1* 3/2024 Cohen ................ G06Q 10/0633
2024/0256996 A1* 8/2024 Okada .................... G06Q 10/04
2025/0146257 A1* 5/2025 Bibard .................... E02F 9/268
2025/0196882 A1* 6/2025 Keller ...................... G06N 3/08

OTHER PUBLICATIONS

Rossi, Andrea, et al. "Embedded smart sensor device in construction site machinery." Computers in Industry 108 (2019): 12-20. (Year: 2019).*

Sherafat, Behnam, et al. "Automated methods for activity recognition of construction workers and equipment: State-of-the-art review." Journal of Construction Engineering and Management 146.6 (2020): 03120002. (Year: 2020).*

Non-Final Office Action for U.S. Appl. No. 19/387,409, dated Jan. 15, 2026, 105 pages.

PCT International Search Report and Written Opinion, PCT Application No. PCT/US2025/055204, Mar. 12, 2026, 11 pages.

* cited by examiner

COORDINATION AT A MACHINE FOR CONSTRUCTION OBJECTIVES

CROSS REFERENCE TO RELATED APPLICATION

This application claims the benefit of U.S. Provisional Application No. 63/719,522, filed Nov. 12, 2024, which is incorporated by reference.

BACKGROUND

Field of Disclosure

This disclosure relates to performing construction actions in a construction environment, and, more specifically, to automatically coordinating construction actions taken by machines in a construction environment using one or more generative language models.

Description of the Related Art

Vehicles and other machines perform actions within construction environments to complete construction objectives, such as building a structure, moving a piece of earth, installing equipment, and the like. The coordination of these actions is conventionally handled manually by human operators, who must decide which machine performs each task and when, often relying solely on their own observations and experience. But communication between operators is limited while work is underway, and information sharing is fragmented, thus leaving operators with only partial visibility of the broader site conditions and project status. This fragmented manual process is highly susceptible to human error and is further constrained by the operators' limited perspectives, frequently resulting in suboptimal, inefficient, or even incorrect execution of actions. Problems such as duplicate or conflicting actions, delayed adjustment to obstacles or changing conditions, and misallocation of resources are common, which impedes progress toward construction objectives and increases operational risk. Further, existing automation technologies generally focus on individual machines and lack the unified, adaptive coordination necessary for a dynamically changing, multi-machine site. Thus, a system for automatically coordinating machines in a construction environment is necessary.

SUMMARY

A vehicle (e.g., a farming, construction, or mining vehicle) moves through an environment (e.g., a farming, construction, or mining environment) and performs one or more actions (e.g., farming, construction, or mining actions) in the environment to progress towards an objective. A local coordinator at the vehicle receives data captured at the vehicle and maintains a local state of the environment representing the conditions and locations of other machines and objects in the environment around the vehicle. The local coordinator shares the local state with a master coordinator that communicates with multiple local coordinators at multiple machines in the environment. The master coordinator updates the global state based on received local states and determines actions for vehicles to complete in the environment to meet the objective. The master coordinator may determine actions using one or more generative language models that may access historical project data and project documents to inform its determination of actions. The master coordinator sends instructions to perform actions to respective vehicles for execution such that the vehicles work together towards completing the objective by each performing their own actions. The master coordinator sends updated instructions to the local coordinators of the vehicles based on changes in the global state. The local coordinators may apply one or more generative language models to alter the instructions within parameters specified by the master coordinator as conditions of the environment changes, obstacles are detected, and the like.

In some embodiments, a master coordinator communicatively connected to a plurality of local coordinators maintains a global state representative of a construction site. The global sate may include location and settings of machines within the environment, conditions of the environment, location of workers in the environment, and the like. The master coordinator determines actions for vehicles within the construction site to perform to complete a construction objective and sends the instructions to complete actions to the local coordinators of the vehicles. The master coordinator updates the global state based on local states received from the local coordinators, which update their respective local states as they receive data from the construction site. The master coordinator may, dynamically and in real-time, update the actions needed to complete the construction objective based on the updated global state and sends instructions to the local coordinators for the vehicles to perform the updated actions. The master coordinator continues to update the global state and monitor progress towards the construction objective as the vehicles perform the actions and may send more instructions to the vehicles based on the global state and progress.

The descriptions above are applicable to a variety of different environments and vehicles, such as construction vehicles (e.g., motor graders) or agricultural or farming vehicles (e.g., tractors).

Figure 1A:
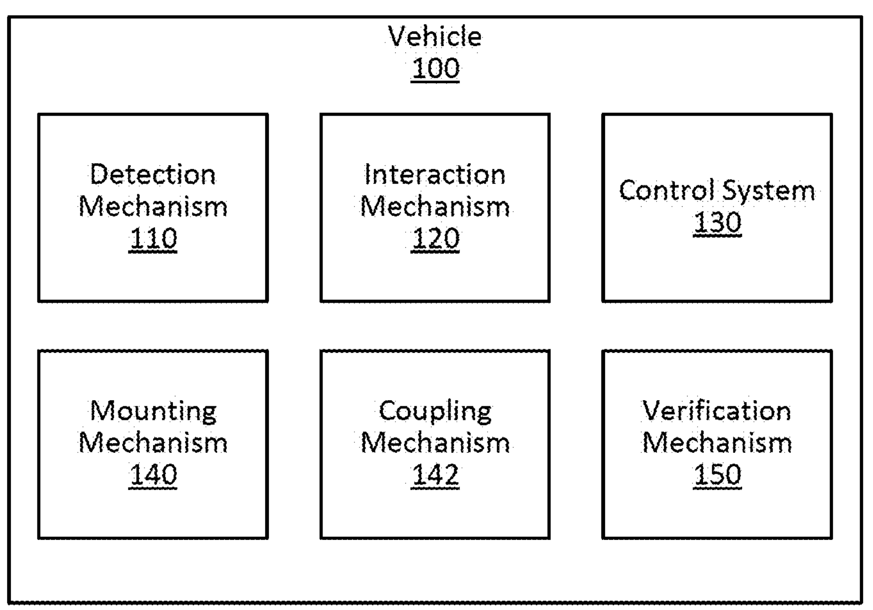
FIG. 1A illustrates a block diagram of a that performs actions of a protocol, in accordance with an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A vehicle (e.g., a farming, construction, or mining vehicle) includes one or more sensors capturing information about the surroundings as the vehicle moves through an environment. The environment can include various objects (e.g., ground and obstructions) used to determine actions (e.g., performing a jobsite action, modifying a jobsite parameter, modifying an operational parameter, and modifying a sensor parameter, etc.) for the vehicle to operate in the environment.

The vehicle includes a control system that processes the information obtained by the sensors to generate corresponding actions. For example, the control system processes information to identify objects to generate corresponding jobsite actions. There are many examples of a vehicle (e.g., a farming vehicle) processing visual information obtained by an image sensor coupled to the vehicle to identify and treat plants and identify and avoid obstructions. For example, the vehicle as described in U.S. patent application Ser. No. 16/126,842 titled "Semantic Segmentation to Identify and Treat Plants in a Construction environment and Verify the Plant Treatments," filed on Sep. 10, 2018, which is hereby incorporated by reference in its entirety. The same systems and methods can be applied for a construction vehicle configured to determine and perform jobsite actions.

The control system of the vehicle includes a local coordinator that dynamically instructs the vehicle to perform actions within the environment as other vehicles work in the environment and conditions within the environment change. The local coordinator communicates with a master coordinator that coordinates actions amongst all or a portion of the vehicles and other machines within the environment to efficiently and optimally complete objectives. The master coordinator dynamically instructs the vehicles and other machines via associated local coordinators based on its understanding of the environment as a whole, as determined based on data captured by the vehicles and other machines and sent to the master coordinator.

In some embodiments, the master coordinator interacts with one or more coordination models to determine actions for vehicles within an environment to take. The master coordinator receives sensor data captured by sensors in the environment and determines a state of the environment, including states of the machines within the environment. Based on these states and goals and guidelines provided to the master coordinator, the master coordinator may prompt a coordination model to determine a set of actions to be performed at one or more locations in the environment for each vehicle. In some embodiments, the master coordinator prompts a plurality of coordination models, each trained to provide insights or recommendations for a specific goal, type of sensor data, or type of vehicle.

In some embodiments, the master coordinator interacts with one or more coordination models to determine optimized plans and specific actions for machines to take within an environment. The master coordinator receives and synthesizes real-time sensor data captured from various sources, such as LIDAR, radar, weather stations, drones, project management software, and the machines themselves, to build and maintain a detailed global state describing current site conditions, machine status, resource locations, and ongoing actions. Based on this global state, along with project objectives, guidelines, and constraints, the master coordinator formulates prompts to the one or more coordination models, which determine a coordinated sequence of construction actions, including the allocation of resources, geographic a scheduling assignment of machines and personnel, and alterations for handling changing conditions or obstacles.

In some embodiments, the master coordinator engages a hierarchy of coordination models: a master coordination model for high-level project planning and additional coordination models trained for specific goals, types of sensor data, or categories of vehicles, machines, or construction actions. The master coordinator may decompose construction objectives into a set of high-level construction actions, leverage the appropriate additional coordination models to develop detailed sub-plans and assign actions for specific machines or areas, and iterate or update its prompts as new sensor data or operator input becomes available. This approach enables the master coordinator to support both broad strategic coordination and fine-grained, adaptive control of diverse machines and systems within the site, ensuring the collective effort continually advances project objectives while accounting for real-time changes.

II. Environment Management and Protocols

Environment Management

Managers (e.g., agricultural, construction, mining managers) are responsible for managing operations in one or more environments. Managers (also referred to as external operator) work to implement an objective (e.g., a farming, construction, or mining objective) within those environments and select from among a variety of jobsite actions (e.g., construction actions) to implement that objective. Traditionally, managers are, for example, a human (e.g., project manager or construction worker) that works the environment (e.g., construction site) but could also be other systems configured to manage operations within the environment. For example, a manager could be an automated machine (e.g., vehicle), a machine learned computer model, etc. In some cases, a manager may be a combination of the managers described above. For example, a manager may include a human assisted by a machine learned model and one or more automated machines.

Managers implement one or more objectives for an environment. An objective is typically a macro-level goal for an environment. For example, macro-level construction objectives may include moving and configuring building materials, excavating a construction site, removing debris, welding building materials together, or any other suitable construction objective. However, objectives may also be a micro-level goal for the environment. For example, micro-level construction objectives may include digging a hole in a particular location, repairing or correcting a part of construction equipment, requesting feedback from a manager, etc. Of course, there are many possible objectives and combinations of objectives, and the previously described examples are not intended to be limiting.

Objectives are accomplished (at least in part) by one or more vehicles performing a series of actions. Example vehicles are described in greater detail below. Actions (e.g., farming, construction, or mining actions) are any operation implementable by a vehicle within the environment that works towards an objective. Consider, for example, a construction objective of building a fountain. This construction objective requires a litany of actions, e.g., excavating a site for the foundation of the fountain, installing plumbing, assembling and joining pieces of material, etc. Similarly, each construction action pertaining to building the fountain may be a construction objective in and of itself. For instance, installing plumbing for the fountain can require its own set of construction actions, e.g., digging in the ground, laying pipes, welding pipes, etc.

In other words, managers implement an action protocol ("protocol" or "plan") in the environment to accomplish an objective. The protocol, depending on the machine form, may be a farming, construction, or mining protocol. A protocol is a hierarchical set of macro-level or micro-level objectives that accomplish the objective of the manager. Within a protocol, each macro or micro-objective may require a set of actions to accomplish, or each macro or micro-objective may be an action itself. So, to expand, the protocol is a temporally sequenced set of actions to apply to the environment that the manager expects will accomplish the objective.

When executing a protocol in an environment, the protocol itself or its constituent objectives and actions have various results. A result is a representation as to whether, or how well, a vehicle accomplished the protocol, objective, or action. A result may be a qualitative measure such as "accomplished" or "not accomplished," or may be a quantitative measure such as "35% built." Results can also be positive or negative, depending on the configuration of the vehicle or the implementation of the protocol. Moreover, results can be measured by sensors of the vehicle, input by managers, or accessed from a datastore or a network.

Traditionally, managers have leveraged their experience, expertise, and technical knowledge when implementing actions in a protocol. In a first example, a manager may spot check dryness of the ground to determine whether concrete can be laid for a foundation. In a second example, a manager may refer to previous implementations of a protocol to determine the best time to build a house to avoid the rainy season. In a third example, a manager may rely on established best practices in determining a specific set of construction actions to perform in a protocol to accomplish a construction objective.

Leveraging manager and historical knowledge to make decisions for a protocol affects both spatial and temporal characteristics of a protocol. For example, construction actions in a protocol have historically been applied to an entire environment (e.g., building site) rather than small portions of the environment. To illustrate this example further, when a manager determines where to extract dirt within a jobsite, they select different extraction methods based on the location and type of dirt. Similarly, each action in a sequence of actions of a protocol are historically performed at approximately the same time. For example, when a manager decides to remove a boulder from a jobsite, any other boulders in the jobsite that need to be removed would be removed within a similar time range rather than sporadically.

Notably though, vehicles have greatly advanced in their capabilities. For example, vehicles continue to become more autonomous, include an increasing number of sensors and measurement devices, employ higher amounts of processing power and connectivity, and implement various machine vision algorithms to enable managers to successfully implement a protocol.

Because of this increase in capability, managers are no longer limited to spatially and temporally monolithic implementations of actions in a protocol. Instead, managers may leverage advanced capabilities of vehicles to implement protocols that are highly localized and determined by real-time measurements in the environment. In other words, rather than a manager applying a "best guess" protocol to an entire environment, they can implement individualized and informed protocols for each structure, piece of earth, or hole in the environment.

III. Example Vehicles

FIG. 1A is a block diagram of a vehicle 100 (also referred to as a work vehicle) that performs actions of a protocol, according to an example embodiment. The vehicle 100 may be a vehicle used for farming (e.g., a tractor), construction (e.g., a motor grader), or mining (e.g., a dragline excavator). In the example of FIG. 1A, the vehicle 100 includes a detection mechanism 110, an interaction mechanism 120, a control system 130, a mounting mechanism 140, a coupling mechanism 142, and a verification mechanism 150. The described components and functions of the vehicle 100 are just examples, and a vehicle can have different or additional components and functions other than those described below. For example, the vehicle may also include a power source, digital memory, communication apparatus, or any other suitable component that enables the vehicle 100 to implement actions in a protocol.

Operating Environment

The vehicle 100 operates in an operating environment 102 (also referred to as the environment 102). The environment 102 is a geographic area where the vehicle 100 implements actions of a protocol. Example environments include a farming field (indoor or outdoor), a construction site, or a mining area. An environment may include any number of environment portions. An environment portion is a subunit of an environment. The vehicle 100 can execute different actions for different environment portions. Moreover, an environment and an environment portion are largely interchangeable in the context of the methods and systems described herein. That is, protocols and their corresponding actions may be applied to an entire environment or an environment portion depending on the circumstances at play.

The operating environment 102 may include the ground and objects in, on, or above the ground. As such, actions the vehicle 100 implements as part of a protocol may be applied to the ground. The ground may include soil but can alternatively include sponge or any other suitable ground type.

Detection Mechanism(s)

The vehicle 100 may include a detection mechanism 110. The detection mechanism 110 identifies objects in the operating environment 102 of the vehicle 100. To do so, the detection mechanism 110 obtains information describing the environment 102 (e.g., sensor or image data), and processes that information to identify pertinent objects (e.g., plants, the ground, building materials, persons, etc.) in the operating environment 102. Identifying objects in the environment 102 further enables the vehicle 100 to implement actions in the environment.

The vehicle 100 can include any number or type of detection mechanism 110 that may aid in determining and implementing actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the vehicle 100. For example, the detection mechanism 110 may include an array of cameras configured to capture an array of pictures representing the environment 102 surrounding the vehicle 100. The detection mechanism 110 may also be a sensor that measures a state of the vehicle 100. For example, the detection mechanism 110 may be a speed sensor, a heat sensor, or some other sensor that can monitor the state of a component of the vehicle 100.

A detection mechanism 110 may be mounted at any point on the mounting mechanism 140. Depending on where the detection mechanism 110 is mounted relative to the interaction mechanism 120, one or the other may pass over a geographic area in the environment before the other. For example, the detection mechanism 110 may be positioned on the mounting mechanism 140 such that it traverses over a geographic location before the interaction mechanism 120 as the vehicle 100 moves through the environment. In another examples, the detection mechanism 110 is positioned to the mounting mechanism 140 such that the two traverse over a geographic location at substantially the same time as the vehicle 100 moves through the environment. Similarly, the detection mechanism 110 may be positioned on the mounting mechanism 140 such that the interaction mechanism 120 traverses over a geographic location before the detection mechanism 110 as the vehicle 100 moves through the environment. The detection mechanism 110 may be statically mounted to the mounting mechanism 140 or may be removably or dynamically coupled to the mounting mechanism 140. In other examples, the detection mechanism 110 may be mounted to some other surface of the vehicle 100 or may be incorporated into another component of the vehicle 100.

Verification Mechanism(s)

The vehicle 100 may include a verification mechanism 150. Generally, the verification mechanism 150 records a measurement of the operating environment 102 and the vehicle 100 may use the recorded measurement to verify or determine the extent of an implemented action (i.e., a result of the action).

To illustrate, consider an example where a vehicle 100 implements an action based on a measurement of the operating environment 102 by the detection mechanism 110. The verification mechanism 150 records a measurement of the same geographic area measured by the detection mechanism 110 and where vehicle 100 implemented the determined action. The vehicle 100 then processes the recorded measurement to determine the result of the action. For example, the verification mechanism 150 may record an image of an object (e.g., tree) in a geographic region identified by the detection mechanism 110 and treated by an interaction mechanism 120. The vehicle 100 may apply an interaction detection algorithm to the recorded image to determine the result of the interaction applied to (or around) the object.

Information recorded by the verification mechanism 150 can also be used to empirically determine operation parameters of the vehicle 100 that will obtain the desired effects of implemented actions (e.g., to calibrate the vehicle 100, to modify protocols, etc.). For instance, the vehicle 100 may apply a calibration detection algorithm to a measurement recorded by the vehicle 100. In this case, the vehicle 100 determines whether the actual effects of an implemented action are the same as its intended effects. If the effects of the implemented action are different than its intended effects, the vehicle 100 may perform a calibration process. The calibration process changes operation parameters of the vehicle 100 such that effects of future implemented actions are the same as their intended effects. To illustrate, consider the previous example where the vehicle 100 recorded an image of a treated object (e.g., a tree). There, the vehicle 100 may apply a calibration algorithm to the recorded image to determine whether the interaction is appropriately calibrated (e.g., at its intended location in the operating environment 102). If the vehicle 100 determines that the vehicle 100 is not calibrated (e.g., the applied interaction is at an incorrect location), the vehicle 100 may calibrate itself such that future interactions are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the interaction mechanism 120 is positioned there between. In this configuration, the verification mechanism 150 traverses over a geographic location in the operating environment 102 after the interaction mechanism 120 and the detection mechanism 110. However, the mounting mechanism 140 can retain the relative positions of the system components in any other suitable configuration. In some configurations, the verification mechanism 150 can be included in other components of the vehicle 100.

The vehicle 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the vehicle 100. For example, the verification mechanism 150 may include an array of cameras configured to capture an array of pictures representing the operating environment 102.

Interaction Mechanism(s)

The vehicle 100 may include one or more interaction mechanisms 120. The interaction mechanism 120 can implement actions in the operating environment 102 of a vehicle 100 (although not all actions need to be performed by the interaction mechanism 120). For instance, a vehicle 100 may include an interaction mechanism 120 that applies an interaction to an object in the operating environment 102. More generally, the vehicle 100 employs the interaction mechanism 120 to apply an interaction to an interaction area, and the interaction area may include anything within the operating environment 102 (e.g., a hole or structure). In other words, the interaction area may be any portion of the operating environment 102.

If an interaction is a construction interaction, the interaction mechanism 120 applies an interaction to further construction in the environment. The interaction mechanism 120 may apply interactions to identified pieces of earth (e.g., rocks, dirt, etc.) or building materials. For example, the vehicle 100 may identify and interact with a specific rock in the environment. Alternatively, or additionally, the vehicle 100 may identify some other trigger that indicates an interaction is necessary and the interaction mechanism 120 may apply a construction interaction. Some example construction interaction mechanisms 120 include one or more pavers, one or more loaders, one or more boom lifts, and one or more other physical implements configured to manipulate material in a construction environment. Other construction interaction mechanisms 120 are also possible.

If the interaction is a ground interaction, the interaction mechanism 120 applies an interaction to some portion of the ground in the environment. The interaction mechanism 120 may apply interactions to identified areas of the ground, or non-identified areas of the ground. For example, the vehicle 100 may identify and interact with an area of ground in the environment. Alternatively, or additionally, the vehicle 100 may identify some other trigger that indicates a ground interaction and the interaction mechanism 120 may apply an interaction to the ground. Some example interaction mechanisms 120 configured for applying interactions to the ground include: one or more excavators, one or more forklifts, and one or more physical implements configured to manipulate the ground (e.g., a pile driver tool), but other ground interaction mechanisms 120 are also possible.

Depending on the configuration, the vehicle 100 may include various numbers of interaction mechanisms 120 (e.g., 1, 2, 5, 20, 60, etc.). An interaction mechanism 120 may be fixed (e.g., statically coupled) to the mounting mechanism 140 or attached to the vehicle 100. Alternatively, or additionally, an interaction mechanism 120 may be movable (e.g., translatable, rotatable, etc.) on the vehicle 100. In one configuration, the vehicle 100 includes a single interaction mechanism 120. In this case, the interaction mechanism 120 may be actuatable to align the interaction mechanism 120 to an interaction area 122. In a second variation, the vehicle 100 includes an interaction mechanism 120 assembly comprising an array of interaction mechanisms 120. In this configuration, an interaction mechanism 120 may be a single interaction mechanism 120, a combination of interaction mechanisms 120, or the interaction mechanism 120 assembly. Thus, either a single interaction mechanism 120, a combination of interaction mechanisms 120, or the entire assembly may be selected to apply an interaction to an interaction area. Similarly, either the single, combination, or entire assembly may be actuated to align with an interaction area, as needed. In some configurations, the vehicle 100 may align an interaction mechanism 120 with an identified object in the operating environment 102. That is, the vehicle 100 may identify an object in the operating environment 102 and actuate the interaction mechanism 120 such that its interaction area aligns with the identified object.

An interaction mechanism 120 may be operable between a standby mode and an interaction mode. In the standby mode, the interaction mechanism 120 does not apply an interaction, and in the interaction mode, the interaction mechanism 120 is controlled by the control system 130 to apply the interaction. However, the interaction mechanism 120 can be operable in any other suitable number of operation modes.

Control System(s)

The vehicle 100 includes a control system 130. The control system 130 controls operation of the various components and systems on the vehicle 100. For instance, the control system 130 can obtain information about the operating environment 102, processes that information to identify an action to implement, and implement the identified action with system components of the vehicle 100.

The control system 130 can receive information from the detection mechanism 110, the verification mechanism 150, the interaction mechanism 120, or any other component or system of the vehicle 100. For example, the control system 130 may receive measurements from the detection mechanism 110 or verification mechanism 150, or information relating to the state of an interaction mechanism 120 or implemented actions from a verification mechanism 150. Other information is also possible.

Similarly, the control system 130 can provide input to the detection mechanism 110, the verification mechanism 150, or the interaction mechanism 120. For instance, the control system 130 may be configured to input and control operating parameters of the vehicle 100 (e.g., speed or direction). Similarly, the control system 130 may be configured to input and control operating parameters of the detection mechanism 110 or verification mechanism 150. Operating parameters of the detection mechanism 110 or verification mechanism 150 may include processing time, location, or angle of the detection mechanism 110, image capture intervals, image capture settings, etc. Other inputs are also possible. The control system may be configured to generate machine inputs for the interaction mechanism 120. That is translating an action of a protocol into machine instructions implementable by the interaction mechanism 120.

The control system 130 can be operated by a user operating the vehicle 100, wholly or partially autonomously, operated by a user connected to the vehicle 100 by a network, or any combination of the above. For instance, the control system 130 may be operated by a manager sitting in a cabin of the vehicle 100, or the control system 130 may be operated by a manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the vehicle 100 and connected by a local area network. In another example, the control system 130 may be a series of computers implemented on the vehicle 100, in the cloud, a client device and connected by a wireless area network.

The control system 130 can apply one or more computer models to determine and implement actions in the environment. For example, in an example farming context, the control system 130 can apply a plant identification module to images acquired by the detection mechanism 110 to determine and implement actions. In another example, in an example construction context, the control system 130 can apply a boundary detection module to images acquired by the detection mechanism 110 to determine and implement actions. The control system 130 may be coupled to the vehicle 100 such that an operator (e.g., a driver) can interact with the control system 130. In other embodiments, the control system 130 is physically removed from the vehicle 100 and communicates with system components (e.g., detection mechanism 110, interaction mechanism 120, etc.) wirelessly.

In some configurations, the vehicle 100 may additionally include a communication apparatus, which functions to communicate (e.g., send or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Vehicle Components

In various configurations, the vehicle 100 may include any number of additional components.

For instance, the vehicle 100 may include a mounting mechanism 140. The mounting mechanism 140 provides a mounting point for the components of the vehicle 100. That is, the mounting mechanism 140 may be a chassis or frame to which components of the vehicle 100 may be attached but could alternatively be any other suitable mounting mechanism 140. More generally, the mounting mechanism 140 statically retains and mechanically supports the positions of the detection mechanism 110, the interaction mechanism 120, and the verification mechanism 150.

The vehicle 100 may include locomoting mechanisms. The locomoting mechanisms may include any number of wheels, continuous treads, articulating legs, or some other locomoting mechanism(s). For instance, the vehicle 100 may include a first set and a second set of coaxial wheels, or a first set and a second set of continuous treads. In the either example, the rotational axis of the first and second set of wheels/treads are approximately parallel. Further, each set may be arranged along opposing sides of the vehicle 100. Typically, the locomoting mechanisms are attached to a drive mechanism that causes the locomoting mechanisms to translate the vehicle 100 through the operating environment 102. For instance, the vehicle 100 may include a drive train for rotating wheels or treads. In different configurations, the vehicle 100 may include any other suitable number or combination of locomoting mechanisms and drive mechanisms.

The vehicle 100 may also include one or more coupling mechanisms 142 (e.g., a hitch). The coupling mechanism 142 functions to removably or statically couple various components of the vehicle 100. For example, a coupling mechanism may attach a drive mechanism to a secondary component such that the secondary component is pulled behind the vehicle 100. In another example, a coupling mechanism may couple one or more interaction mechanisms 120 to the vehicle 100.

The vehicle 100 may additionally include a power source, which functions to power the system components, including the detection mechanism 110, control system 130, and interaction mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the vehicle 100.

Example vehicles 100 configured for various environments are further described below with reference to FIGS. 1B-1G.

III.A Example Farming Vehicles

An example embodiment of vehicle 100 is a farming vehicle. A farming vehicle is a vehicle configured to operate in a farming environment and to accomplish (or contribute to accomplishing) one or more objectives in the farming environment. A farming action may be any operation implementable by a farming vehicle within the farming environment that works towards the one or more objectives. Farming vehicles can include a wide variety of vehicles (e.g., tractors, drapers, balers, tillers, and harvesters) which can perform a variety of farming actions (e.g., planting, spraying, weeding, pruning, and harvesting) in farming protocols to accomplish farming objectives (e.g., planting a field or applying a pesticide to a field). An example farming environment is a field (e.g., for growing crops).

Figure 1B:
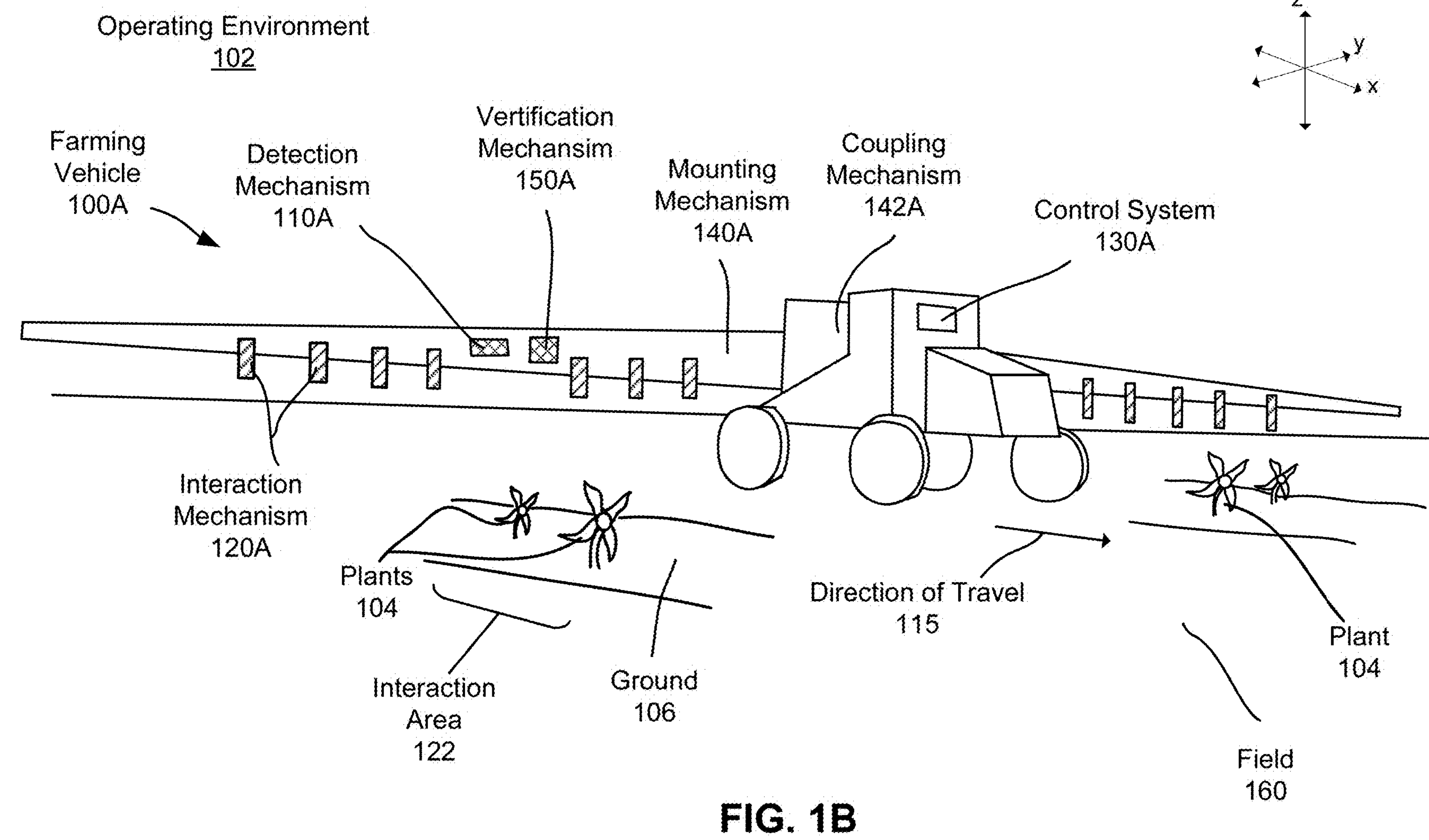
FIG. 1B illustrates an isometric view of a farming vehicle, in accordance with an example embodiment.
Figure 1C:
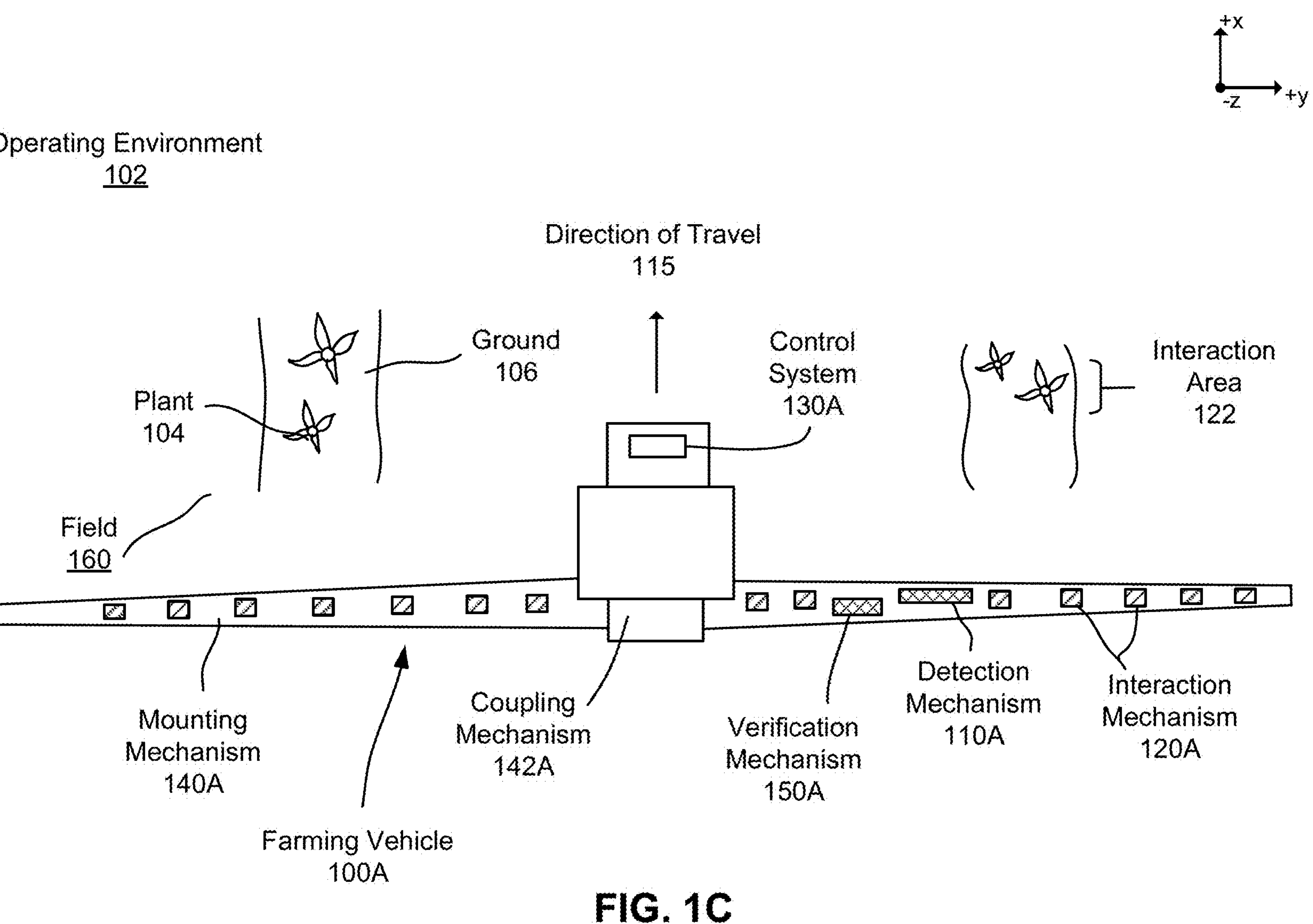
FIG. 1C illustrates a top view of the farming vehicle in FIG. 1B, in accordance with the example embodiment.
Figure 1D:
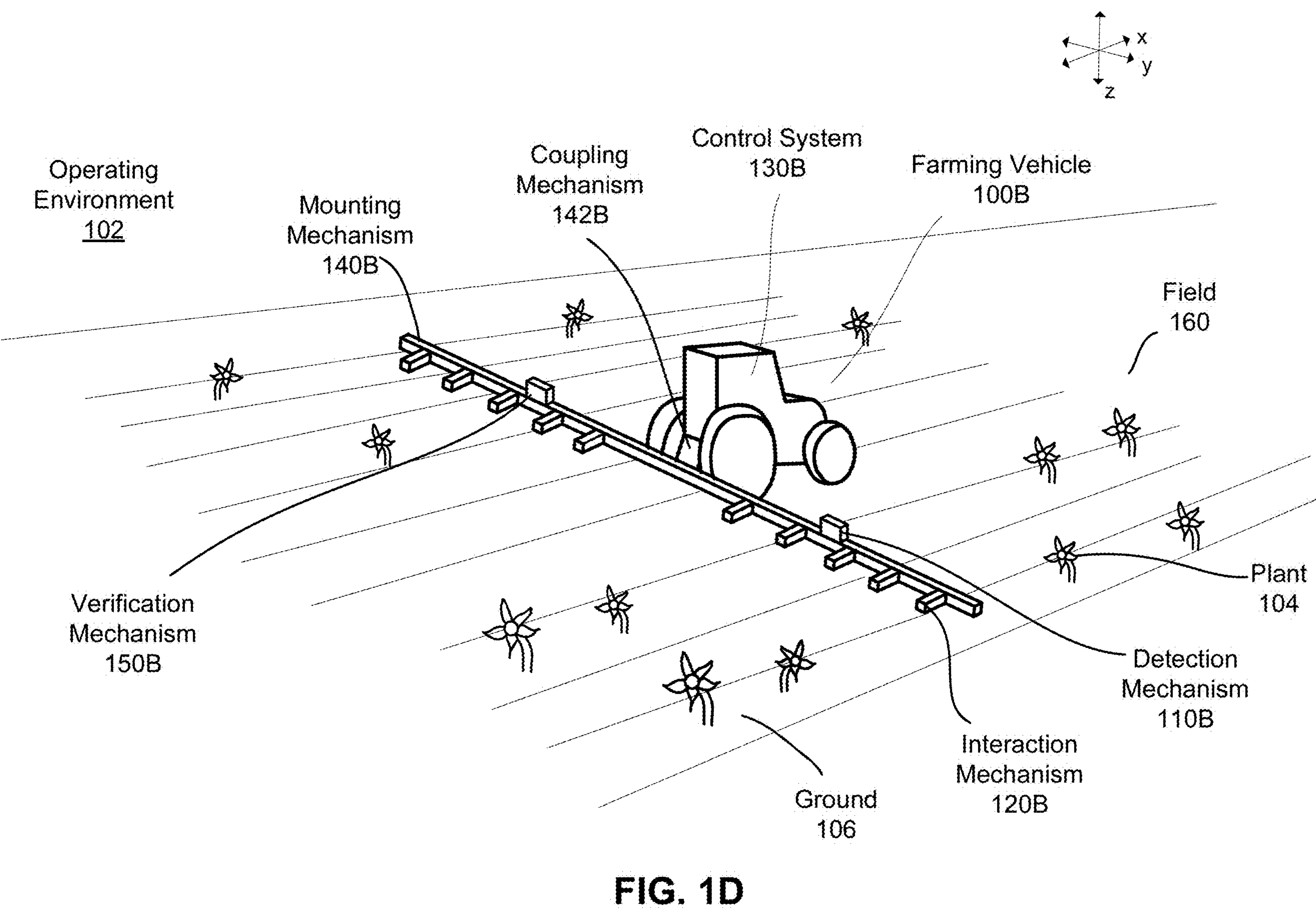
FIG. 1D illustrates an isometric view of a second farming vehicle, in accordance with an example embodiment.

FIGS. 1B-1D illustrate example farming vehicles (100A, 100B), according to some embodiments. Specifically, FIG. 1B is an isometric view of a tractor farming vehicle 100A that performs farming actions of a protocol, according to one example embodiment, and FIG. 1C is a top view of the farming vehicle 100A in FIG. 1B. FIG. 1D is an isometric view of another tractor farming vehicle 100B that performs farming actions of a protocol, in accordance with one example embodiment. As illustrated, the farming vehicles (100A, 100B) each include a detection mechanism (110A, 110B), an interaction mechanism (120A, 120B), a control system (130A, 130B), a mounting mechanism (140A, 140B), a coupling mechanism (142A, 142B), and a verification mechanism (150A, 150B), which are example embodiments of the corresponding components in FIG. 1A.

The farming vehicles in FIGS. 1B-1D are each configured to implement a farming action which applies an interaction to one or more plants 104 or the ground 106 within the environment 102. A farming interaction may be included in a protocol to regulate plant growth. As such, interactions may be applied directly to a single plant 104 but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

If the interaction is a plant interaction, the effect of treating a plant with an interaction mechanism (e.g., 120A) may include any of plant necrosis, plant growth stimulation, plant portion necrosis or removal, plant portion growth stimulation, or any other suitable interaction effect. Moreover, the interaction mechanism can apply an interaction that dislodges a plant 104 from the ground 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, or injects one or more working fluids into the ground 106 adjacent to a plant 104 (e.g., within a threshold distance from the plant). Other plant interactions are also possible. When applying a plant interaction, the interaction mechanisms may be configured to spray one or more of: an herbicide, a fungicide, insecticide, some other pesticide, or water.

In a particular example, the farming vehicle is configured to implement an action which applies an interaction that necroses the entire plant 104 (e.g., weeding) or part of the plant 104 (e.g., pruning). In this case, the action can include dislodging the plant 104 from the ground 106, incinerating a portion of the plant 104 (e.g., with directed electromagnetic energy such as a laser), applying an interaction concentration of working fluid (e.g., fertilizer, hormone, water, etc.) to the plant 104, or treating the plant 104 in any other suitable manner. In another example, a farming vehicle (e.g., 100A) is configured to implement an action which applies an interaction to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or ground 106, applying a disease interaction or insect interaction to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

In the examples of FIGS. 1B-1D, the mounting mechanism (140A, 140B) extends outward from a body of the farming vehicle (100A, 100B) such that the mounting mechanism 140 is approximately perpendicular to the direction of travel 115. In some configurations, the mounting mechanism (140A, 140B) may include an array of interaction mechanisms (120A, 120B) positioned laterally along the mounting mechanism (140A, 140B). In some configurations, the farming vehicle (100A, 100B) may not include a mounting mechanism (140A, 140B), the mounting mechanism (140A, 140B) may be alternatively positioned, or the mounting mechanism (140A, 140B) may be incorporated into any other component of the vehicle (100A, 100B).

The plants 104 can be crops but can also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed. More generally, plants 104 may include a stem that is arranged superior to (e.g., above) the ground 106 and a root system joined to the stem that is located inferior to the plane of the ground 106 (e.g., below ground). The stem may support any branches, leaves, or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the ground 106. In various examples, the plant 104 may be a vascular plant 104, non-vascular plant 104, ligneous plant 104, herbaceous plant 104, or be any suitable type of plant 104.

Plants 104 in an environment may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within an environment may include the same type of crop (e.g., same genus, same species, etc.). For example, each portion in an environment may include corn crops. However, the plants 104 within each environment may also include multiple crops (e.g., a first, a second crop, etc.). For example, some environment portions may include lettuce crops while other environment portions include pig weeds, or, in another example, some environment portions may include beans while other environment portions include corn. Additionally, a single environment portion may include different types of crops. For example, a single environment portion may include a soybean plant 104 and a grass weed.

III.B Example Construction Vehicles

Another example embodiment of vehicle 100 is a construction vehicle. A construction vehicle is a vehicle configured to operate in a construction environment and to accomplish (or contribute to accomplishing) one or more objectives in the construction environment. A construction action may be any operation implementable by a construction vehicle within the construction environment that works towards the one or more objectives. Construction vehicles can include a wide variety of vehicles (e.g., bulldozers, front loaders, dump trucks, backhoes, graders, trenchers, cranes, loaders, crawler dozers, compactors, forklifts, conveyors, and mixer trucks) which can perform a variety of construction actions (e.g., excavating, pile driving, loading objects, unloading objects, lifting objects, clearing debris, grading, and digging trenches) in construction protocols to accomplish construction objectives (e.g., building a road, digging a trench, digging a hole, clearing a portion of dirt, or moving dirt from point A to point B).

An example construction environment that a construction vehicle can operate in is a construction site or project site. A construction environment may be an area used to construct, repair, maintain, improve, extend, or demolish buildings, infrastructure, or industrial facilities. A construction environment may include one or more of the following: a secure perimeter to restrict unauthorized access, site access control points, office and welfare accommodation for personnel from the main contractor and other firms involved in the project team, or storage areas for materials, machinery (e.g., construction vehicles), or equipment. In some cases, a construction environment is formed when the first feature of a permanent structure has been put in place, such as pile driving, or the pouring of slabs or footings.

Figure 1E:
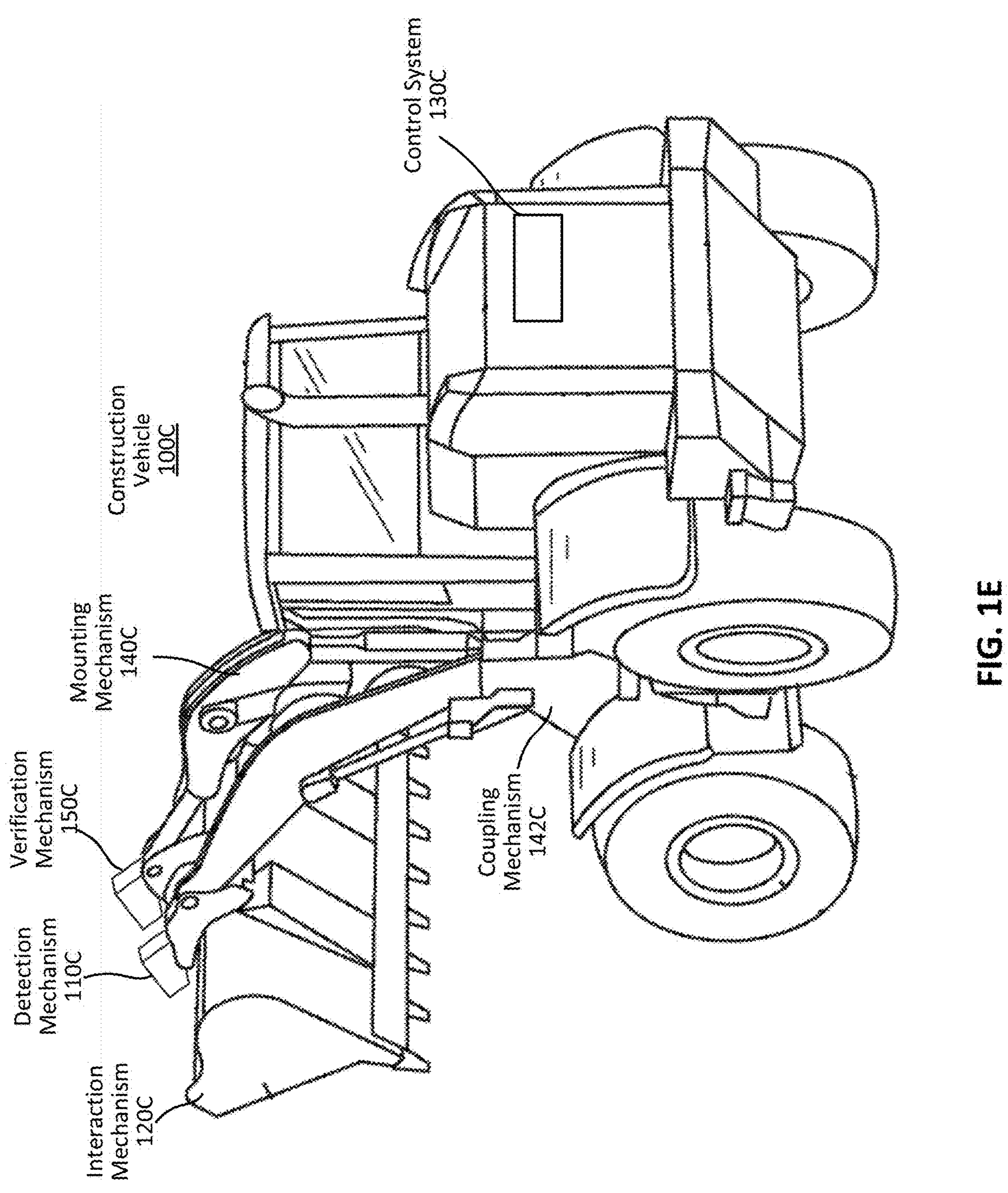
FIG. 1E illustrates an isometric view of a construction vehicle, in accordance with an example embodiment.
Figure 1F:
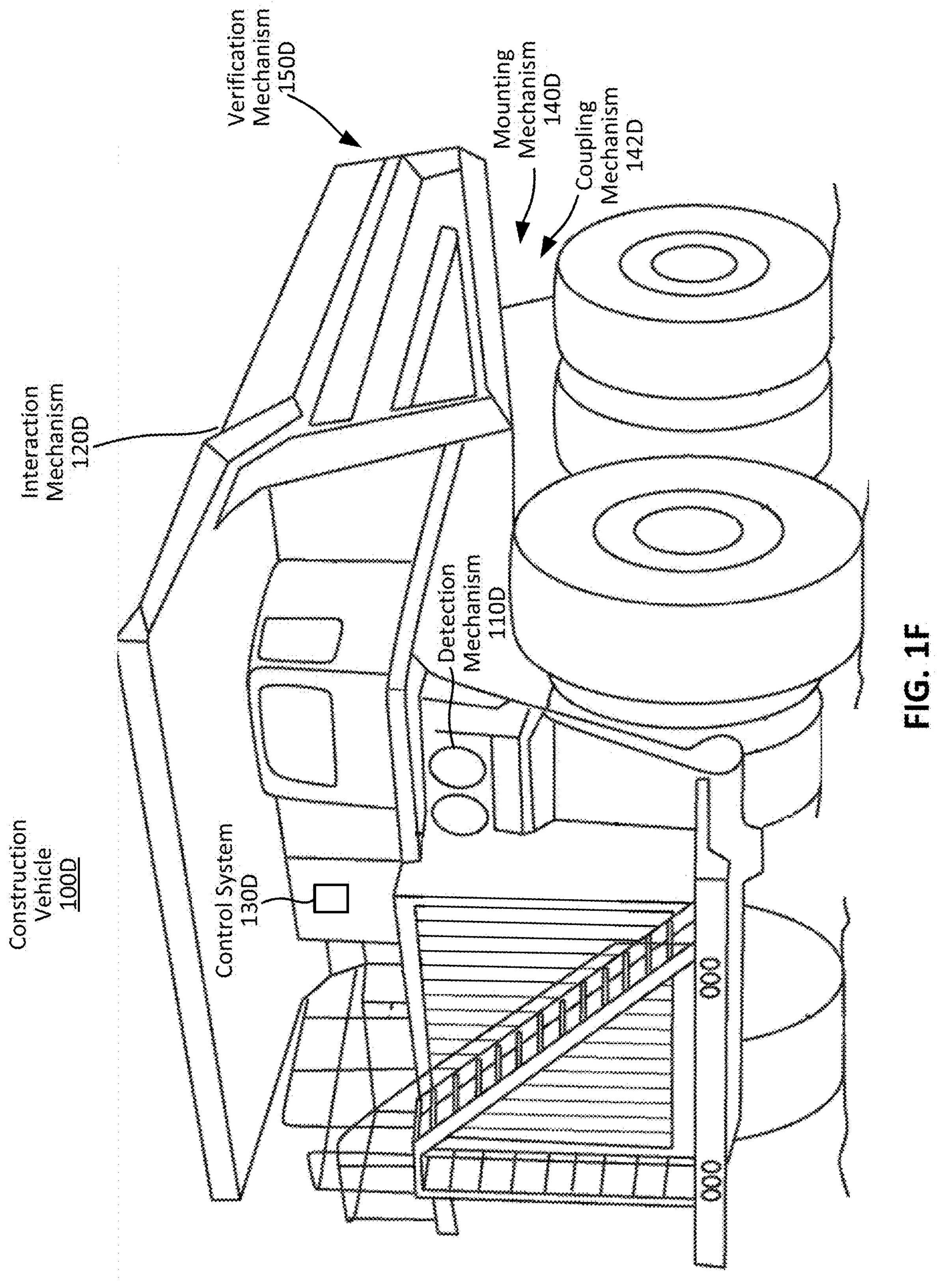
FIG. 1F illustrates an isometric view of a second construction vehicle, in accordance with an example embodiment.

FIGS. 1E and 1F illustrate example construction vehicles (100C, 100D), according to some embodiments. Specifically, FIG. 1E is an isometric view of a wheel loader construction vehicle 100C, and FIG. 1F is an isometric view of a dump truck construction vehicle 100D. As illustrated, each construction vehicle (100C, 100D) each include a detection mechanism (110C, 110D), an interaction mechanism (120C, 120D), a control system (130C, 130D), a mounting mechanism (140C, 140D), a coupling mechanism (142C, 142D), and a verification mechanism (150C, 150D), which are example component embodiments of the corresponding components in FIG. 1A.

In one example situation, the loader 100C in FIG. 1E is engaged in moving material from a pile to the interaction mechanism 120D (e.g., cargo bed) of the dump truck 100D in FIG. 1F. To fill the truck 100D, the loader 100C starts by moving forward along a path to pick up a load and, once at the pile, digs the interaction mechanism 120C (e.g., bucket) into the pile to fill the interaction mechanism 120C with material. Then, the loader 100C backs away from the pile, while turning to face the dump truck 100D. Then the loader drives to the dump truck 100D, raising its interaction mechanism 120C (e.g., bucket) and dumps the material into the interaction mechanism 120D of the dump truck 100D. Afterwards, the loader 100C backs up and turns to face the pile, repeating the process. As further described below, the loader 100C may encounter moisture during any of these construction actions or before or after the completion of the objective, in between objectives, or in other scenarios. The loader 100C or the dump truck 100D may employ a control system (130C, 130D) to identify moisture in the environment. For instance, the control system 130C may employ a traversability model to reduce the likelihood of the loader 100C becoming immobilized (e.g., getting stuck) in terrain, and may employ a moisture model to reduce the likelihood of the loader 100C performing an action that will damage the environment.

IV. System Environment

Figure 2:
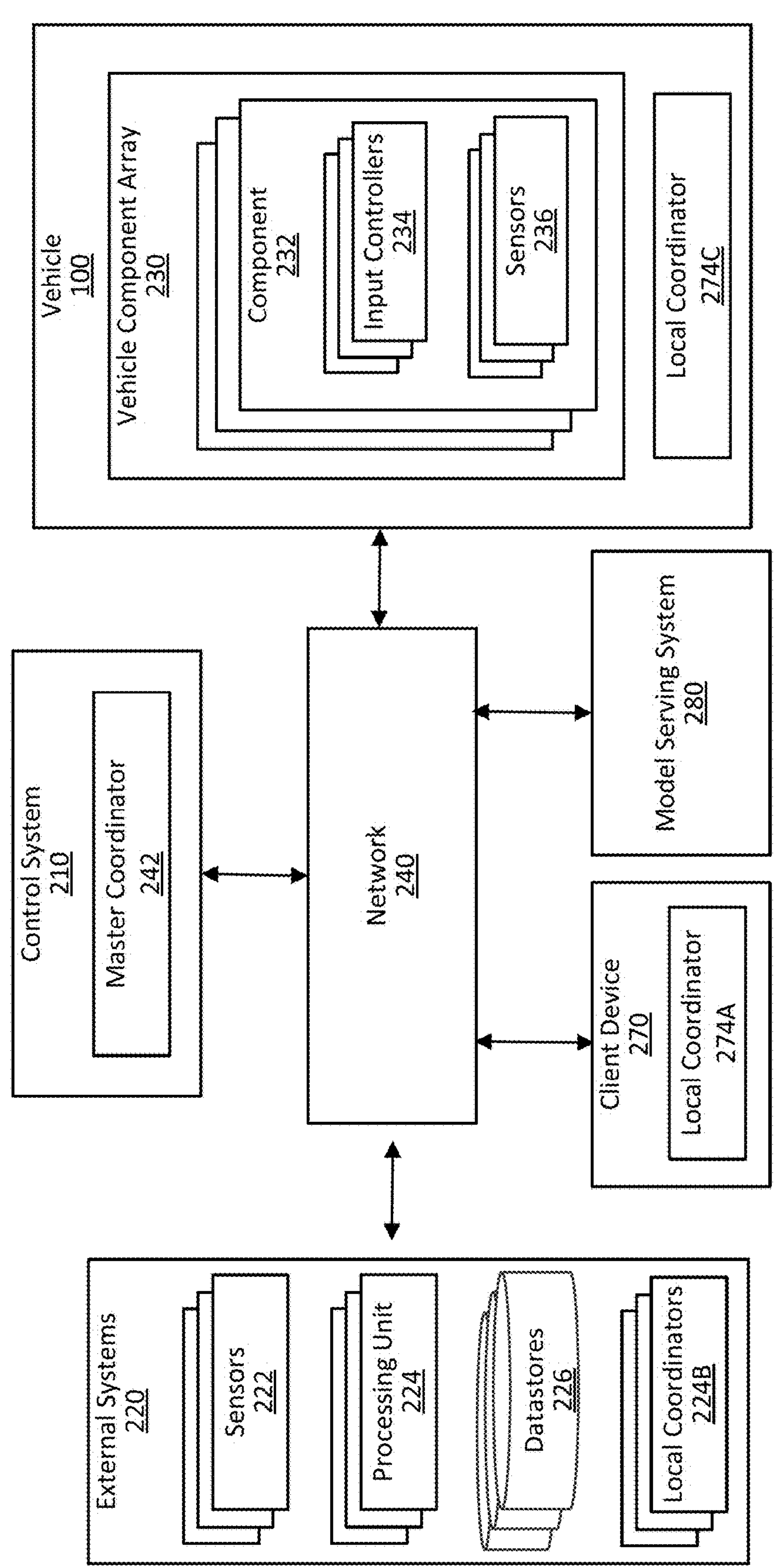
FIG. 2 is a block diagram of the system environment for a vehicle, in accordance with one or more example embodiments.

FIG. 2 is a block diagram of the system environment 200 for the vehicle 100, in accordance with one or more example embodiments. In this example, the control system 210 (e.g., control system 130) is connected to a client device 270, external systems 220, and a vehicle 100 including a vehicle component array 230 via a network 240 within the system environment 200. Each of the client device 270, external systems 220, and vehicle 100 include local coordinators 274, which are further described in relation to the master coordinator 242 below.

A client device 270 can be any portable or wired computing device capable for use by an operator to interface with the control system 210. For instance, a client device 270 may be a portable wireless device that can be carried by an operator, such as a smartphone, cellular phone, tablet, personal digital assistant (PDA), navigation system, handheld GPS system, laptop, or other such device. For some use cases, the client device 270 may be a less-mobile device such as a desktop or a laptop computer. Furthermore, the client device 270 may be a computing device built into a vehicle 100. Although only one client device 270 is shown in FIG. 2, any number of client devices 270 may be connected to the control system 210 over the network 240. Furthermore, the system environment 200 may contain different or additional elements and functionality may be distributed between the client device 270, external systems 220, vehicle 100, and control system 210 in different manners than described below.

The external systems 220 are any system that can generate data representing information useful for determining and implementing actions in an environment. External systems 220 may include one or more sensors 222, one or more processing units 224, and one or more datastores 226. The one or more sensors 222 can measure the environment 102, the vehicle 100, etc. and generate data representing those measurements. For instance, the sensors 222 may include a rainfall sensor, a wind sensor, heat sensor, a camera, etc. The processing units 2240 may process measured data to provide additional information that may aid in determining and implementing actions in the environment. For instance, a processing unit 224 may access an image of an environment and may access historical weather information for an environment to generate a forecast for the environment.

Datastores 226 store historical information regarding the vehicle 100, the operating environment 102, etc. that may be beneficial in determining and implementing actions. For instance, the datastore 226 may store results of previously implemented protocols and actions for an environment, a nearby environment, or the region. The historical information may have been obtained from one or more vehicles (i.e., measuring the result of an action from a first vehicle with the sensors of a second vehicle). Further, the datastore 226 may store results of specific actions in the environment, or results of actions taken in nearby environments having similar characteristics. The datastore 226 may also store historical weather, flooding, environment use, objects in the environment, etc. for the environment and the surrounding area. Finally, the datastores 226 may store any information measured by other components in the system environment 200.

The vehicle 100 includes a vehicle component array 230 of one or more components 232. Components 232 are elements of the vehicle 100 that can take actions (e.g., an interaction mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 232 in response. A sensor 236 generates data representing measurements of the operating environment and provides that data to other systems and components within the system environment 200. The measurements may be of a component 232, the vehicle 100, the operating environment, etc. For example, a sensor 236 may measure a configuration or state of the component 232 (e.g., a setting, parameter, power load, etc.), measure conditions in the operating environment (e.g., moisture, temperature, etc.), capture information representing the operating environment (e.g., images, depth information, distance information), and generate data representing the measurement(s). Although only one vehicle 100 with a vehicle component array 230 is shown in FIG. 2, any number of vehicles 100 with a vehicle component arrays 230 may be connected to the control system 210 over the network 240. In some embodiments, one or more vehicles may include an onboard external system 220 capable of generating data at the vehicle 100.

The control system 210 receives information from external systems 220 and the vehicle component array 230 and implements a protocol in an environment with a vehicle. The control system 210 may include one or more models and instructions to operate the vehicle in an environment. For example, in FIG. 2, the control system 210 includes a master coordinator 242 that communicates with local coordinators 274 connected via the network 240. The master coordinator 242 and local coordinators 274 are further described below in relation to FIG. 3.

The network 240 connects nodes of the system environment 200 to allow microcontrollers and devices to communicate with each other. In some embodiments, the components are connected within the network as a Controller Area Network (CAN). In this case, within the network each element has an input and output connection, and the network 240 can translate information between the various elements. For example, the network 240 receives input information from the external system 220, processes the information, and transmits the information to the control system 210. The control system 210 generates an action based on the information and transmits instructions to implement the action to the appropriate component(s) 232 of the component array 230.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

The model serving system 280 receives requests from the control system 210 to perform tasks using machine-learned models. In some embodiments, the model serving system 280 may also receive requests from the external systems 220, vehicle 100, or client device 270. The tasks include, but are not limited to, natural language processing (NLP) tasks, audio processing tasks, image processing tasks, video processing tasks, and the like. In one embodiment, the machine-learned models deployed by the model serving system 280 are models configured to perform one or more NLP tasks. The NLP tasks include, but are not limited to, text generation, query processing, machine translation, chatbots, and the like. In one embodiment, one or more of the machine-learned models is configured as a transformer neural network architecture. Specifically, the transformer model is coupled to receive sequential data tokenized into a sequence of input tokens and generates a sequence of output tokens depending on the task to be performed.

The model serving system 280 receives a request including input data (e.g., text data, audio data, image data, video data, documents, or other construction zone data) and encodes the input data into a set of input tokens. The model serving system 280 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a text generation task, the transformer model may receive a prompt and continue the conversation or expand on the given prompt in human-like text.

When the machine-learning model is a generative language model (also referred to as a generative model or language model herein), the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the generative language models are large language models (LLMs) that are trained on a large corpus of training data to generate outputs for the NLP tasks.

An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the control system 210 or one or more entities different from the control system 210. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations. While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

Though described primarily in relation to LLMs herein, the machine-learned model may be additional models of combinations of models. In some embodiments, the machine-learned model is or includes a VLAM (Vision-Language Alignment Model). The VLAM may be configured to process paired visual and textual inputs, such as an image and its corresponding descriptive text, to generate aligned multi-modal embeddings. The VLAM may utilize a combination of a vision encoder, such as a vision transformer (ViT) or convolutional neural network (CNN), and a language encoder, such as a transformer or LSTM, to extract features from each modality. These features are then projected into a shared embedding space, where alignment is achieved using objectives such as contrastive loss, ensuring that matched image-text pairs have similar representations while mismatched pairs are distinguished.

In some embodiments, the machine-learned model is or includes a VLM (Vision-Language Model). The VLM may be designed to jointly process and reason over both visual and textual data using an integrated or fused architecture. The VLM may utilize attention-based mechanisms, such as cross-attention layers that explicitly model interactions between visual and textual features, or may employ unified transformers that operate over combined multi-modal inputs. The VLM may be pre-trained on large-scale image-text datasets and may be fine-tuned for a variety of downstream vision-language tasks, including visual question answering, image captioning, and visual reasoning. The VLM may generate textual descriptions from images, answer questions about visual content, or generate images conditioned on text, depending on the application and the direction of cross-modal generation or understanding required.

In one embodiment, the task for the model serving system 280 is based on knowledge from the control system 210 that is fed to the machine-learned model of the model serving system 280, rather than relying on general knowledge encoded in the model weights of the model. For example, the models for the additional coordinator described below may be based on historical construction zone data captured or received by the control system 210. Thus, one objective may be to perform various types of queries on the external data in order to perform any task that the machine-learned model of the model serving system 280 could perform. For example, the task may be to perform question-answering, text summarization, text generation, and the like based on information contained in an external dataset.

V. Coordination Between Machines

Figure 3:
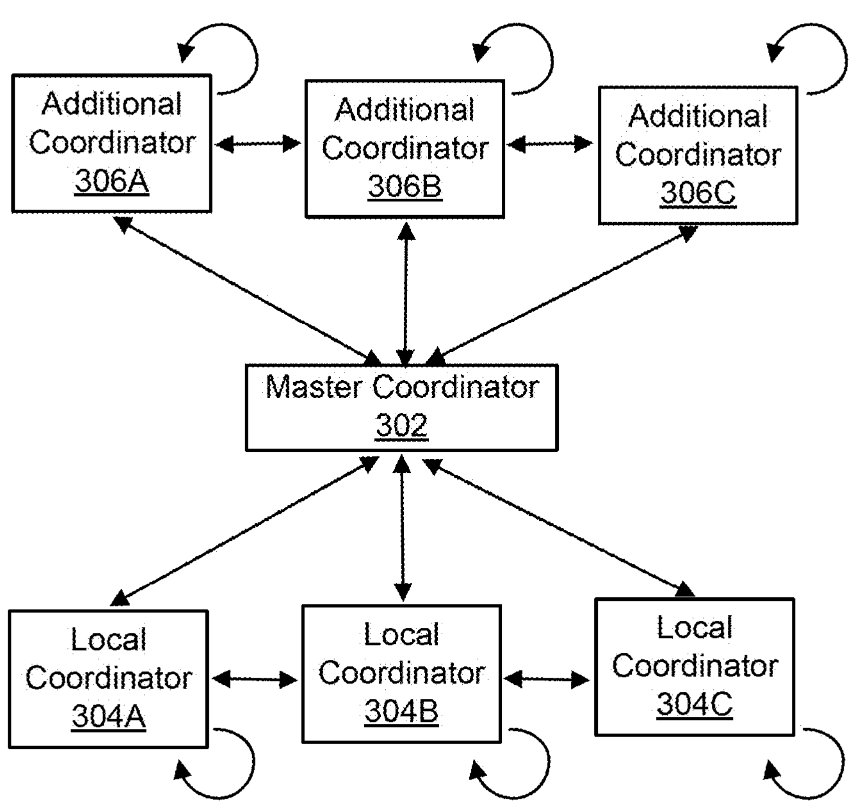
FIG. 3 is a block diagram of communications between a master coordinator and local coordinators, in accordance with one or more example embodiments.

FIG. 3 is a block diagram 300 of communications between a master coordinator 302 and local coordinators 304A-B, in accordance with one or more example embodiments. The master coordinator 302 communicates from the control system 210 to the local coordinators 304A-c, which can be located at/on external systems 220, vehicles 100, and/or client devices 270.

Coordination Overview

The master coordinator 302 may serve as a central control system for coordinating construction actions in a dynamic environment. The master coordinator 302 may maintain a comprehensive global state that reflects the current status of all machines, resources, and actors (e.g., external operators and workers) within a project site. The global state ay include aggregated real-time data received by the master coordinator 302 from vehicles 100, external systems 220, and client devices 270 (henceforth referred to collectively as machines for simplicity). The master coordinator 302 may leverage the global state to generate, update, and optimize high-level project plans and construction objectives, balancing constraints such as cost, speed, resource availability, and safety. As an agentic artificial intelligence (AI) model, the master coordinator 302 may autonomously set project goals and construction objectives, assign actions to resources, dynamically adapt plans in response to changing site conditions or new construction objectives, and resolve discrepancies in reported states, ensuring that overall project progress is coherent, efficient, and responsive to both automated and operator-provided inputs.

Each local coordinator 304 may operate on an individual machine within a construction environment and may continuously monitor and manage the local state of its assigned machine. Using sensor data, communication with other local coordinators 304 in the environment, and communication with the master coordinator 302, a local coordinator 304 may interpret its immediate surroundings, execute directed construction actions, respond to real-time environmental conditions, and adapt construction actions as needed based on updated information. The local coordinators 304 may also share and receive state updates, enabling local decision-making that is informed by both direct perception and the broader context provided by the global state. This distributed, agentic approach allows local coordinators 304 to rapidly respond to unexpected events, such as obstacles or sudden weather changes, and to collaborate either peer-to-peer or under the guidance of the master coordinator 302, ensuring operational safety and efficiency at the machine level.

The master coordinator 302 and/or local coordinators 304 may interact with one or more additional coordinators 306, each associated with one or more resources or construction actions. The additional coordinators 306 in refining plans and determining sub-actions for particular types of construction actions or resources. For example, when the master coordinator 302 sets a high-level objective or construction action, a relevant additional coordinator 306 may generate a detailed sequence of sub-actions tailored to the specific machine type, environmental constraints, and project requirements involved. The additional coordinators 306 may further interact with each other to decompose tasks hierarchically and exchange details about resource needs, conditions, and optimal execution strategies. By modularizing and distributing the planning process in this way, the control system 210 achieves greater flexibility and scalability, ensuring that even highly complex projects are broken down into actionable steps that are appropriately matched to the available resources and site conditions.

Each of the master coordinator 302, local coordinators 304, and additional coordinators 306 may interact with one or more coordination models to perform the functions described above. The coordination models may be an LLM, VLAM, VLM, or other type of generative language model or combination or generative language models. In some embodiments, the coordination models are one or more different types of other machine-learning models.

Master Coordinators

The master coordinator 302 facilitates coordination of construction actions taken in an environment. The master coordinator 302 maintains a global state representative of current state of affairs within the environment. The global state includes the most recent data received by the master coordinator 302 about each vehicle 100, external system 220, and/or client device 270 (referred to collectively as machines) within the environment. For example, a global state of a construction site may include where each machine is located within the site and what action each machine has performed and is performing in the construction site, and an amount of fuel/energy available at the machine. The global state may further include data representative of current conditions in the construction site, such as weather, temperature, time of day, detected amount of dust, amount of earth material removed from the construction site, and the like, as measured by the vehicles 100 and/or external systems 220. The global state may also account for the locations and current actions of non-connected actors (e.g., construction workers and pedestrians), objects (e.g., building materials, rocks, etc.), and machines, in the environment. In some embodiments, the global state may be represented as a heat map or virtual rendering of the environment and presented to one or more client devices 270 associated with the project.

The master coordinator 302 receives construction zone data from vehicles 100 and external systems 220 in the construction zone. The construction zone data describes the state of the environment and of each vehicle 100 within the environment. The construction zone data may include sensor data such as Lidar data, radar data, weather data, soil condition data, satellite images, drone scans, and soil maps. The construction zone data may also include project data such as design files, existing and future utilities of the construction zone, supply flows in and out of the construction zone, builders, materials, project schedules, timeline, cash flows, contracts, available personnel and their records, project management information and tools, sub-contractor inputs, records, and data, bid requirements, and standards/compliance requirements. In some embodiments, the construction zone data also includes data describing previous states of the construction zone and actions taken as the construction zone. For example, the construction zone data may indicate that a building was demolished within the construction zone and the construction zone was otherwise exposed to a set of environmental (e.g., weather, soil, etc.) conditions until construction began within the construction zone.

The master coordinator 302 may also receive construction objectives (e.g., guidelines and goals) for one or more projects within the construction zone. The construction objectives may be provided by an external operator or may be based on safety compliance standards. In some embodiments, the master coordinator 302 infers the construction objectives from a project guidance data structure that includes one or more of the global state, one or more local states, construction zone data sensor measurements, previously determined construction objectives, plans for a structure, a budget for the structure, personnel available to perform portions of the plans over a future time period, contracts for the personnel, and vehicles available to be used for the project, and the like. The master coordinator 302 may update the project guidance data structure to include a request to determine construction objectives for the project based on the project guidance data structure. The master coordinator 302 may provide the project guidance data structure to the coordination model that outputs construction actions, construction objectives, and recommendations. For example, in response to receiving the project guidance data structure, the coordination model may indicate that one construction objective is to build a physical structure and another construction objective is to spend less than a budgeted amount to buy materials and pay for personnel. The master coordinator 302 may store the construction objectives in the project guidance data structure.

In some embodiments, the master coordinator 302 itself is an agentic AI model, which is an artificial intelligence (AI) system designed to perceive an environment, make decisions autonomously, and perform actions to achieve specific goals, often adapting its behavior as conditions change. The agentic AI model may operate as an independent "agent" that is capable of continuously gathering data (e.g., from machines in the environment), interpreting context, and planning or reprioritizing actions in a plan for a project in response to real-time feedback. The master coordinator 302 may interact with local coordinators 304 at the machines, where each local coordinator 304 may also be an agentic AI model. The local coordinators 304 may be configured to perceive an environment within a threshold vicinity of the machine, alter construction actions (or sub-actions) based on sensor data it receives or representations of other machines' local state received from their respective local coordinators 304, and alter construction actions based on a global state of the environment received from the master coordinator 302. The agentic AI models of the master coordinator 302 and local coordinators 304 may coordinate actions with one another to meet construction objectives for the project.

The master coordinator 302 may track the state of one or more areas within the construction zone, machines in the construction zone, and workers and other personnel (referred to collectively as workers for simplicity) within the construction zone. The master coordinator 302 may use construction data received from each vehicle as a corresponding state of the vehicle at corresponding timestamps. The master coordinator may also divide up the construction zone into a set of areas and store construction data associated with vehicles 100 and external systems 220 located within each respective area. In some embodiments, the master coordinator stores a level of adherence to one or more guidelines and an amount of progress towards each of one or more goals as part of each associated state. The master coordinator 302 may add each determined state with an associated timestamp to the project guidance data structure.

The master coordinator 302 may determine a plan of construction actions to be performed for a project in the environment. The master coordinator 302 may receive a request from a client device 270 associated with a project manager or other external operator, at periodic intervals, or based on the occurrence of another triggering condition, such as detection of a rapid change in weather conditions in the environment. The request may include a textual, natural language, or parameterized description of the project that includes what the end goal of the project is and instructions for how the project should be completed. The request may also include one or more documents related to the project or potential materials, machines, and workers for the project. The master coordinator 302 may add the request to the project guidance data structure and provide the project guidance data structure to a coordination model configured to determine project parameters that define the scope and requirements for the project, including both dependencies and prerequisites. The project parameters may include required materials, machines (including client devices 270 that may serve as proxies for their associated workers in construction action allocation) necessary to complete construction actions for the project, and settings for the machines. The project parameters may also include available resources (including materials, machines, and workers), construction schedules of resources, budget, necessary weather conditions for one or more construction actions, required ordering of construction actions (e.g., must clear debris from site before beginning construction of foundation), and the like. Other project parameters may include schedules for each worker, specifications for each machine, operating conditions, power requirements, and the like. In some embodiments, the coordination model has access to a datastore of construction actions mapped to construction objectives, which the coordination model may use to determine the plan.

The master coordinator 302 may add the project parameters to the project guidance data structure along with a request to determine a schedule of constructions actions to be performed to complete the project and input the project guidance data stricture to a coordination model configured to determine a plan of construction actions for the project. Each construction action may be associated with one or more resources needed for the construction action, a time period for performance of the construction action, a location in the environment for performance of the construction action, and one or more guidelines indicative of alterations that may be made to the construction action, its resources, and location. For example, an alteration may indicate to use bamboo if steel is not available, but specify that bamboo should only be used for low-rise structures built for the project. In another example, an alteration may include a bounded area within which the location may be moved based on construction zone data. The construction zone data may include detection of an obstacle at the location, lack of ground stability at the location, traffic conditions amongst the machines, vehicles, and workers at the site, and the like. The coordination model may provide a schedule of the construction actions to the master coordinator 302 as the plan for the project and may store the schedule of construction actions in the project guidance data structure.

In some embodiments, the master coordinator 302 improves an approach for achieving the constructive objectives or adhering the project parameters. Optimizing may involve balancing factors such as speed, cost, resource availability, safety, or other constraints. In some embodiments, the project guidance data structure may include prioritized balances among these factors received from an external operator. The master coordinator 302 may provide the project guidance data structure to a coordination model that configured to provide a plan that most effectively achieve construction objectives while adhering to specified priorities and constraints.

In some embodiments, the plan includes assignment of each machine to a particular geographic area within the construction site such that the machine does not leave its assigned geographic area while performing actions. These assignments may be stored in the project guidance data structure. The master coordinator 302 may apply the coordination model to the project guidance data structure to determine which machines are able to complete particular construction actions based on their geographic areas. For example, the master coordinator 302 may assign a first machine and a second machine to dig a hole such that the first machine only digs within a first geographic area and the second machine only digs within a second, non-overlapping geographic area. The master coordinator 302 may apply the coordination model to update the geographic areas assigned to each machine based on the global state reflected in the project guidance data structure. For example, the master coordinator 302 may provide instructions to the second machine to dig in the first machine's geographic area upon determining that the first machine is not capable of moving a particular rock from the hole. The master coordinator 302 may also assign machine densities to geographic areas within the construction site, as determined by the coordination model. A machine density indicates a limit of machines that can be within the geographic area at the same time. For example, the master coordinator 302 may assign a machine density of two machines to a narrow section of elevated earth in a construction site. Thus, if a first and second machine are within the narrow section, a third machine will not enter the section until the first or second machine leaves, despite needing to traverse the narrow section to complete a construction action.

In some embodiments, the master coordinator 302 may cause a client device 270 to present the plan via a user interface, such that an external operator associated with the client device 270 may approve, reject, or alter the plan. In response to rejection or alteration of the plan, the master coordinator 302 may provide an indication of the rejection or alteration to a coordination model configured to revise the plan based on the feedback. The master coordinator 302 may iterate between revising the plan and presenting the plan via the client device 270 until it receives approval of the plan. In some embodiments, the master coordinator 302 may automatically provide the plan to one or more client devices 270 upon creation or approval. The client devices 270 may be specified by the client device 270 that requested the plan for the project, may be identified in documents related to the project, or may be associated with resources allocated for the plan. For example, the master coordinator 302 may send the plan to client devices 270 associated with workers assigned to perform one or more construction actions for the plan. In some embodiments, the master coordinator 302 only sends information about a respective worker's assigned actions to the worker's client device 270, without providing details about additional actions of the plan. The actions may each be presented with indications of resources to be used for the action, a location for performance of the action, environmental conditions required for performance of the construction action, and any other requirement for the construction action.

Additional Coordinators

In some embodiments, the master coordinator 302 uses one or more additional coordinators 306 for various aspects of coordination of the project. The additional coordinators 306 apply specialized coordination models each configured to handle distinct aspects of the overall coordination process. The master coordinator 302 may interact with any number of additional coordinators 306 and may facilitate interactions between the local coordinator 304 and additional coordinators 306. In some embodiments, the local coordinators 304 may interact directly with one or more of the additional coordinators 306. Each additional coordinator 306 may be associated with a particular dimension of project management or site operation. For instance, the additional coordinators 306 may include a planning coordinator, parameter coordinator, scheduling coordinator, weather coordinator, and the like. Each additional coordinator 306 may be designed or fine-tuned for specific decision-making roles, thus providing support towards the overall project coordination by generating detailed sub-plans, recommendations, or constraints relevant to a respective area of expertise. This modular architecture allows new additional coordinators 306 to be added or customized according to the unique requirements and goals of any given project.

In some embodiments, the master coordinator may determine and store a high-level plan for the project in the project guidance data structure. The additional coordinators 306 may access or be provided with the project guidance data structure to determine further details for the project. In some embodiments, one or more of the additional coordinators 306 may be configured to create sub-plans related to particular types of construction actions and machines. For example, a high-level plan may indicate high-level construction actions such as "create water well," "lay foundation of main structure," or "build framing for mains structure." For each high-level construction action, the master coordinator may select an additional coordinator 306A associated with a project parameter of the high-level construction action and provide the selected additional coordinator 306A with the project guidance data structure. For example, the master coordinator 302 may select an excavator coordination model for the high-level construction action "dig trench." Each selected additional coordinator 306A may be configured to determine construction actions that may be done to complete at high-level construction actions and may provide a sequence of construction actions (e.g., a sub-plan) for completing the high-level construction action. Continuing with the example, the sub-plan for "digging a trench" may include "approach site for trench," "stabilize excavator," "extend boom and arm," "lower bucket," etc. The construction actions of sub-plans may be referred to as sub-actions herein. Action and sub-actions may henceforth be referred to collectively as actions for simplicity.

In some embodiments, the additional coordinators 306 and master coordinator 302 may interface to determine a plan of construction actions. Each additional model, once provided with the project guidance data structure, may determine a set of sub-actions for one of the construction actions described in the project guidance data structure. The additional models may also select a project parameter associated with each sub-action. The selected project parameter may be a highest-ranked project parameter determined for each sub-action, where the ranking is based on relevance of the project parameter to the sub-action. For example, an additional coordinator 306B may be tuned to compare a latent space vector of a sub-action to latent space vectors of each associated project parameter and rank the project parameters from highest to lowest similarity. In another example, an additional coordinator 306C may rank the parameters based on construction objectives associated with the project. For instance, the additional coordinator 306C may rank parameters based on cost for a constructive objective of completing the project at a lowest possible cost. The additional coordinator 306C may provide the sub-actions and other portions of the project guidance data structure to a different additional coordinator 306A associated with the selected project parameter, such that the other additional coordinator 306A may provide additional details regarding one or more sub-actions. The additional details may include resources to use for the sub-action, a location to perform the sub-action, a range of environmental conditions that sub-action may be performed in, and the like.

Local Coordinators

The master coordinator 302 communicates with one or more local coordinators 304. Each local coordinator 304 operates on a vehicle 100, external system 220, and/or client device 270 (e.g., machines) and maintains a local state of its respective machine. The local state represents a state of affairs of the environment based on the most recent data about the environment received by the machine. The local coordinator 304 of a machine may update its local state to reflect a position of the machine as it moves, current conditions of the environment based on data captured by the machine, and the like. Current conditions include weather, temperature, time of day, bumps and ruts detected within a path traversed by the machine, and the like. The local coordinator 304 communicates with the master coordinator 302 to update its local state based on the global state. For example, a local coordinator 340*a* may not receive data at its machine about the location of and actions being performed by another machine (e.g., because the other machine is blocked from view or the local coordinator's machine does not have sensors to detect the location and actions of other machines). Instead, the local coordinator 304A updates its local state based on whatever data can obtain locally and communicates with the master coordinator 302 to update its local state to reflect the global state.

The master coordinator 302 may send all or portions of the plan for the project to local coordinators 304 associated with machines allocated for the plan. The local coordinator 304 may cause its machine to perform assigned actions, which may be physical actions such as moving soil or placing material or may be sensor-based actions such as capturing construction zone data, within the parameters associated with each action. For example, the local coordinator 304 may account for machine settings, operating limits, and instructions for tool configuration in preparing and instructing a machine to perform an action. As each machine performs actions, the local coordinator 304 may monitor and update the local state of its machine. The local coordinator 304 may base the local state zone data captured by sensors of 222 its respective machine, based on sensor data captured by other machines, local states received from other machines, and the global state received from the master coordinator 302. This allows the local coordinators 304 to leverage information that they may be unable to glean (e.g., via sensors 222) on their own from their surroundings in the environment. For example, a local coordinator 304A of a first machine may determine that winds have reached more than a threshold speed at its location and send this information to other machines in the environment. A second machine may be associated with a requirement of operating in wind conditions less than the threshold speed, and its local coordinator 304B may stop of alter the second machine's actions based on the information from the first machine.

The local coordinators 304 may share local states with one another in order to update the local states. The local states may include direct perceptions (e.g., images, distance readings, etc.) captured by a machine associated with the local state and deductions made by the local coordinator 304 based on the perceptions. The deductions may include obstacles or people identified in the environment based on the direct perceptions. The local coordinators 304 may direct their machines based on their shared perceptions and deductions. For example, a first local coordinator 304A may send a local state to a second local coordinator 304B, where the local state indicates that an obstacle is in the path or blind spot of the second local coordinator's 304B machine. The second local coordinator 304B may instruct its machine to move based on the location of the obstacle. In another example, a local coordinator 304*c* can send perceptions and deductions from its local state to the master coordinator 302 such that the master coordinator 302 may determine whether to instruct a machine to take action. In some embodiments, the local coordinators 304 share local states when the local coordinators 304 are within communication range of one another but not within communication range of the master coordinator 302. The local coordinators 304 can update their respective local states to reflect a current state of affairs of the construction site as observed by the local coordinators 304. In some embodiments, a first local coordinator 304C may receive the global state from the master coordinator 302 and share the global state with other local coordinators 304 that are within communication range of the first local coordinator 304C but not the master coordinator 302.

The local coordinators 304 may alter assigned actions based on changes in respective local states, which may include equipment suitability and conditions around a machine. For instance, a local coordinator 304 may update its local state to reflect a first construction action being completed by its machine and a second construction action being completed by a second machine. The local coordinator 304 may determine that a third construction action needs to be performed as the next step towards the construction objective but, based on its local state, a third machine that was assigned the third construction action is not currently able to perform the third construction action due to being busy performing another step, breaking down, etc. The local coordinator 304 may reassign the third construction action to its machine or another appropriate machine in order for the third construction action to be performed more quickly than if the third machine were to perform the third construction action. The local coordinator 304 sends reassigned steps to the appropriate machine and to the master coordinator 302, such that the master coordinator 302 may update the global state and further update or reassign steps based on the change.

The local coordinators 304 may also determine whether requirements for an action are met or not dynamically as the action is being performed based on their local states. For example, an excavator may require operation in dry conditions due to viscosity of mud in wet conditions affecting its movement and digging abilities. Thus, in response to detecting that conditions are dry at the site of the project, the excavator's local coordinator 304 may cause the excavator to begin performing its assigned actions. However, in response to detecting that rain has begun to fall in at the site, the local coordinator 304 may cause the excavator to stop performing the actions until the rain stops. The local coordinator 304 may halt or alter actions for systems in response to determining that one or more requirements are not met. For example, a local coordinator 304 of a truck may detect an obstacle in the truck's path as the truck moves to a location in the environment. The local coordinator 304 may cause the truck to stop moving until the obstacle is out of its path or may alter the truck's path based on a bounding area allocated for alterations to the action. This allows the local coordinators 304 to adapt the performance of their respective machines based on real-time environmental conditions, unexpected obstacles, or other changes at the site. In some embodiments, the local coordinator 304 may change or add actions to a sub-plan assigned to a machine by providing a coordination model with a request for additional or alternatives that fit within the requirements and alterations allowed for the sub-plan.

In some embodiments, one or more local coordinators 304 may themselves serve as a "master coordinator" within a machine and hierarchically organize sets of subordinate or component-level additional coordinators 306. This design enables the local coordinators 304 to perform fine-grained monitoring and coordination within individual machines, allowing each local coordinator 304 to aggregate the sensor measurements and local state into a cohesive assessment of machine health and performance. By structuring coordination in this way, local coordinators 304 can execute nuanced, component-aware responses to conditions they detect, autonomously reassign actions when another onboard system is unavailable at a respective machine, and collaborate with their peer local coordinators 304 within the same machine or across different machines in the environment.

The local coordinators 304 may also abstract and package sensor measurements and local states for each machine and provide this packaged data in communications with the master coordinator 302. Thus, rather than transmitting raw or overly granular sensor measurements and other data related to local states, the local coordinators 304 may summarize information into higher-level summaries that are directly relevant to the project coordination and decision-making done by the master coordinator 302. For example, rather than sending an engine's exact RPM or load readings, a local coordinator 304A may simply report that "the engine is functioning optimally" or flag a specific operational concern if detected. This abstraction allows the master coordinator 302 to focus on holistic project outcomes and allocate resources without getting bogged down by subsystem minutiae, while still enabling prompt and effective action when issues arise. In this way, the local coordinators 304 may act as filters that ensure that both fine-grained control and high-level situational awareness are maintained throughout the project.

In some embodiments, each local coordinator 304 may be an agentic AI model that operates as an independent "agent" capable of continuously gathering data (e.g., its respective machine in the environment), interpreting context, and planning or reprioritizing actions for the sub-plan of its respective machine in response to real-time feedback. The local coordinators 302 may interact with the master coordinator 302 and one or more additional coordinators 306, which themselves may also be agentic AI models.

Coordinator Communications

As actions are completed, the local coordinators 304 in the environment may send their local states to the master coordinator 302, which updates the global state to reflect the new status of each machine in the environment. In some embodiments, the global state also includes status of resources in the environment that are not associated with local coordinators 304, such as materials. For example, the global state may include an amount of rebar available at a location within the environment and update the amount as rebar is taken from the location. In another example, the global state may include the location of a worker, which may be tracked by cameras at multiple systems. As the worker moves, the local state of systems capturing image data of the worker may include a relative location of the worker, and the master coordinator 302 may triangulate or otherwise analyze the relative locations based on the locations of the systems to determine a current state of the worker.

As local coordinators 304 share their local states with the master coordinator 302, the master coordinator 302 may update the global state to match the local states. For example, the master coordinator 302 may update the global state to reflect the position of a first machine based on its local state and the position of a second machine based on its local state. The master coordinator 302 may resolve discrepancies between local states (e.g., when data of the local states do not match) received from the local coordinators 304. Examples of discrepancies include data in local states indicating that a singular vehicle is located at different positions, that an action has or has not occurred, and the like. The master coordinator 302 may update the global state with data that was captured more recently, request new data from one or more machines to determine the current state of affairs in the environment, select data that is consistent across multiple local states (as opposed to outlier data), update the global state to include a confidence level associated with the discrepancy, and the like to resolve discrepancies and update the global state to best reflect the current state of affairs of the environment.

The master coordinator 302 may share the global state with the local coordinators 304 such that the local coordinators can update their local states accordingly. The local coordinators 304 may default to the global state upon receiving a new global state, even if data in the local state does not match the global state or may update the local state to reflect aspects of the global state that the local coordinator 304 is unable to ascertain using its own machine. For example, a local coordinator 304B may receive a global state that indicates that a first machine is currently digging and a second machine is currently immobile. The local coordinator 304B may update its local state to reflect that the first machine is digging based on its inability to receive data at its own machine describing the actions of the first machine but may not update its local state to reflect that the second machine is immobile based on the local coordinator having received newer data from its machine indicating that the second machine is moving northwest. The local coordinator 304B may send its local state to the master coordinator 302 such that the master coordinator 302 may update the global state based on the newer data. In another example, a first local state may include data representing an action as viewed from a first vantage point whereas a second local state represents the action as viewed from a second vantage point. Upon receiving both the first and second local states, the master coordinator 302 may update the global state to reflect the action from both vantage points.

The master coordinator 302 and local coordinators 304 may communicate global and local states, respectively, based on one or more triggers. Triggers can include an operator-selected time interval passing, a request sent to the master coordinator 302 and/or local coordinators 304 from an operator via a client device 270, machines coming within communication range of one another, a particular construction action occurring, a particular construction objective being fulfilled, and the like.

The master coordinator 302 may also update the actions for a plan as the global state changes. In some embodiments, the master coordinator 302 may determine that an action is redundant due to a non-connected actor performing the action, that an action requires more sub-actions to be completed based on a change in conditions at the construction site, and the like. For example, the master coordinator 302 may determine that newly poured concrete requires more curing time based on a change in temperature at the construction site and send instructions to a local coordinator 304B to delay its machine from placing material on the concrete such that it may cure first. In another example, the master coordinator 302 may receive data indicating that a first machine switched from an autonomous mode to a manual mode and completed a first step while in the manual mode, despite the first step being assigned to another machine. To avoid redundancies, the master coordinator 302 may instruct the second machine to not complete the step. In yet another example, the master coordinator 302 may direct a first machine to move in order to provide enough room for a second machine to pass by the first machine or based on a determination that the machine needs to refuel before continuing to perform construction actions.

The master coordinator 302 may further update the plan for the project based on new construction objectives received from an external operator via a client device 270. Such updates may include adding new steps in order to complete a new construction objective, changing steps to meet a set of constraints for a construction objective, rearranging steps based on an indication of priority of construction objectives, and removing steps based on input data from the operator. Other updates may include instructing a machine to take a new path indicated by the operator or instructing a machine to move within the construction site to adhere to a machine density or geographic area specified by the operator. The master coordinator 302 may provide the plan for the project and new construction objectives to a coordination model with a request to determine actions that need to occur within the construction site to meet the new construction objectives. The master coordinator 302 may assign machines already allocated for the plan to the actions or, in some embodiments, may select additional machines to complete actions within the environment. Thus, the master coordinator 302 may dynamically modify the assignment of construction actions, re-tasking machines or workers to new actions and thereby optimizing overall progress toward construction objectives.

Figure 4:
FIG. 4 is flowchart representing a method for instructing machines in a construction environment, in accordance with one or more example embodiments.
Figure 4:
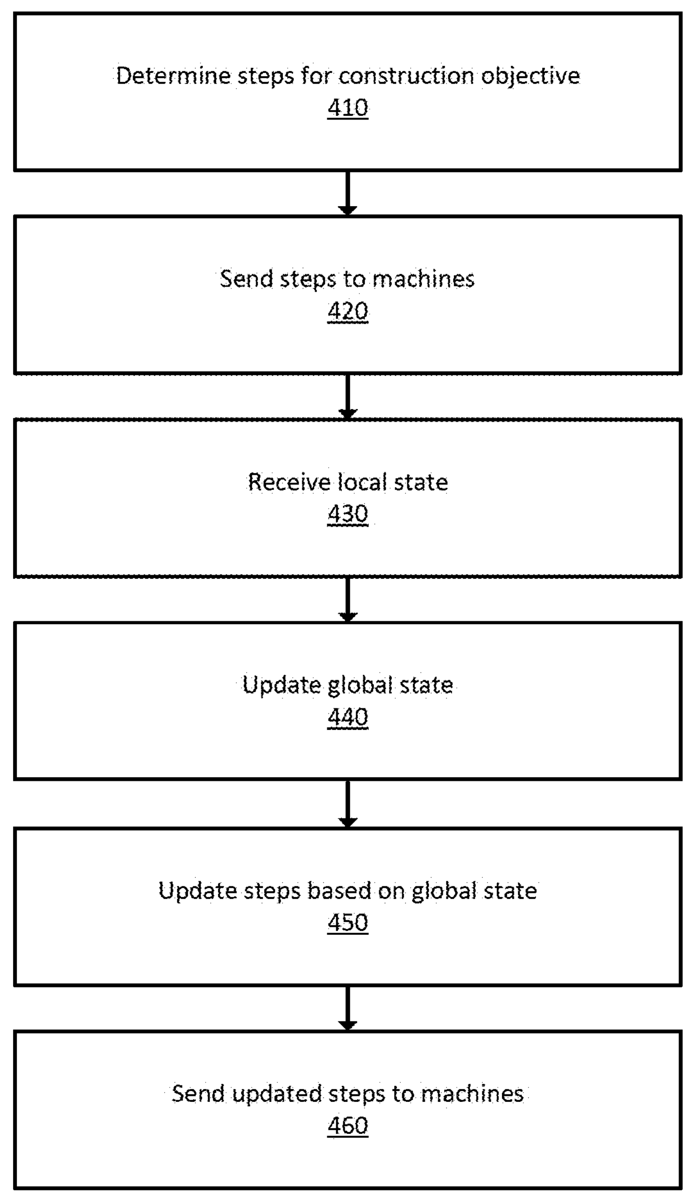

FIG. 4 is flowchart representing a method for instructing machines in a construction environment, in accordance with one or more example embodiments. The steps of FIG. 4 are illustrated from the perspective of the master coordinator 242 (or 302) performing the method 400. However, some or all of the steps may be performed by other entities or components. In addition, some embodiments may perform the steps in parallel, perform the steps in different orders, or perform different steps.

The master coordinator 242 determines a set of steps to be completed to meet a construction objective. The master coordinator 242 may determine the steps based on input from an operator entered via a client device 270, an index of steps mapped to construction actions, output from a machine learning model trained to determine steps for machines to perform to complete construction objectives, and the like. The steps may indicate construction actions to be performed or criteria for the machines to adhere to, such as maintain a minimum distance between machines for safety. The master coordinator 242 selects one or more machines in a construction environment to perform the steps and sends the steps to the respective local coordinators 274 (or 304) of the machines. The machines may be vehicles 100, external systems 220, or client devices 270.

The master coordinator 242 receives a local state from a local coordinator 274A. The local state describes data from the construction site captured from the vantage point of the machine of the local coordinator 274. In some embodiments, the local state also includes data captured from the vantage points of other machines that are communicatively connected to the local coordinator 274 (but may not be connected to the master coordinator 242). The master coordinator 242 updates the global state to reflect the data described in the local state. For example, the global state may indicate that a location within the construction site is not visible from a first vantage point due to dust. The master coordinator 242 may update the global state to include image data of the location from a second vantage point based on data captured by the machine of the local coordinator 274.

The master coordinator 242 updates the steps based on the updated global state. For example, the master coordinator 242 may remove a step to prevent a machine from performing a construction action that is no longer necessary or add a step based on a determination that the current conditions of the environment require an additional construction action to be completed for the construction objective. The master coordinator 242 sends the updated steps to the machines. In an example, the master coordinator may redistribute steps among machines based on the energy levels of each machine. For instance, the master coordinator 242 may reassign a step from a first machine to a second machine based on a determination that the first machine does not have enough fuel to complete the step. The master coordinator 242 may instruct the first machine to refuel instead of completing the step.

In some embodiments, the method 400 includes additional or alternative steps to those shown in FIG. 4. For example, in some embodiments, the machines include cameras mounted throughout the construction site and drones flying over the construction site and are configured to capture image data of the construction site. A local coordinator 274A of a camera may send a local state including visual data from the camera's viewpoint during a time period to the master coordinator 242, and a local coordinator 274C of a drone may send a local state including visual data from the drone's viewpoint during the same time period to the master coordinator 242. The master coordinator may update the global state to reflect the construction site based on the two viewpoints and indicate a confidence level within the global state of overlapping portions of the viewpoints.

Figure 5:
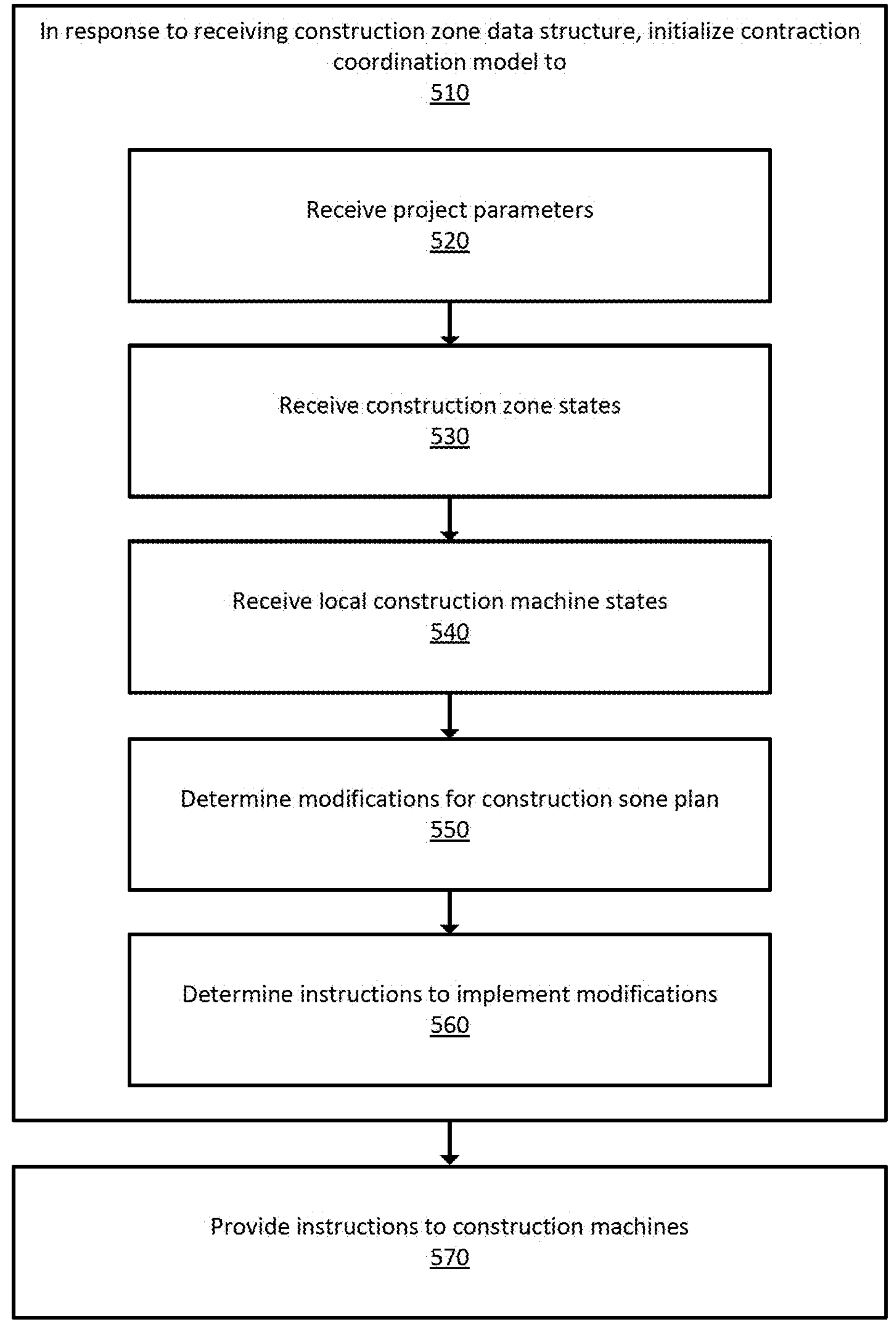
FIG. 5 is flowchart representing a method 500 for determining and implementing modifications to a construction zone plan, in accordance with one or more example embodiments.

FIG. 5 is flowchart representing a method 500 for determining and implementing modifications to a construction zone plan, in accordance with one or more example embodiments. The steps of FIG. 5 are illustrated from the perspective of the master coordinator 242 (or 302) performing the method 500. However, some or all of the steps may be performed by other entities or components. In addition, some embodiments may perform the steps in parallel, perform the steps in different orders, or perform different steps.

The method 500 begins with initializing 510 a construction coordination model (e.g., the master coordinator 242 as an agentic AI model) using the construction zone data structure in response to receiving a construction zone data structure representing the construction zone and project parameters. The construction coordination model 520 receives one or more project parameters, where each of the one or more project parameters provides a representation of construction resource and generated by a first coordination model initialized by the construction coordination model. In some embodiments, the project parameters include one or more of available construction materials, available construction machines, design documents, schedules of construction machines, schedules of construction workers, specifications for each available machine, operating conditions required for each available machine, and power requirements for each available machine.

The construction coordination model receives 530 construction zone states from construction zone sensors present at the construction zone and receives 540 one or more local construction machine states from a plurality of construction machines present in the zone. Each of the one or more local construction machine states is generated by a respective second coordination model utilized by the respective construction machine. The construction coordination model determines 550, based on the project parameters, construction zone states, and the construction machine states, one or more modifications for a construction zone plan the construction machines are implementing in the construction zone. The construction coordination model determines 560 instructions for one or more construction machines of the plurality to implement the determined modifications to the construction zone plan. The construction coordination model provides 570, to the one or more construction machines, the instructions to implement the determined modifications to the construction zone plan. The one or more construction machines perform one or more construction machine actions to implement the construction zone plan with the determined modifications.

In some embodiments, the first coordination model (e.g., the master coordination model) is configured to interact with a set of third coordination models (e.g., the additional coordinators 306), and each of the set of third coordination models has access to historical knowledge related to a respective project parameter.

In some embodiments, the construction plan includes one or more actions and each action is assigned to a machine in the zone. The determined modifications include one or more additional actions, and the construction coordination model selects a highest ranked project parameter for each action. The ranking may be determined by the first coordination model. The construction coordination model provides, to a respective third coordination model associated with the respective selected project parameter, a prompt requesting determination of one or more sub-actions for a machine associated with the action to take to complete the action. In some embodiments, each respective third coordination model outputs a sequence of sub-actions based on the respective prompt. The construction coordination model generates, for each sub-action in the sequence, a set of instructions for performing the sub-actions. The construction coordination model sends, for each sub-action, the respective set of instructions to the respective machine, where the sets of instructions are ordered according to the sequence of associated sub-actions.

In some embodiments, the construction zone sensors are located at one or more locations in the zone and capture construction zone data representative of a construction zone state at a respective location. The construction zone data may indicate locations of one or more machines in the zone, environmental condition data for the zone, and a current action being performed by each of the one or more machines.

In some embodiments, the construction coordination model determines the one or more modifications by accessing, for each action in the construction zone plan, a set of alteration constraints indicative of modifications permitted for each construction machine and the construction zone. The construction coordination model determines, for at least one action of the construction zone plan, a new location, speed, time of performance, or ordering for the at least one action.

In some embodiments, each of the one or more construction zone states reflects one or more positions of machines in the construction zone and current conditions of the construction zone based on data captured by the machines.

Figure 6:
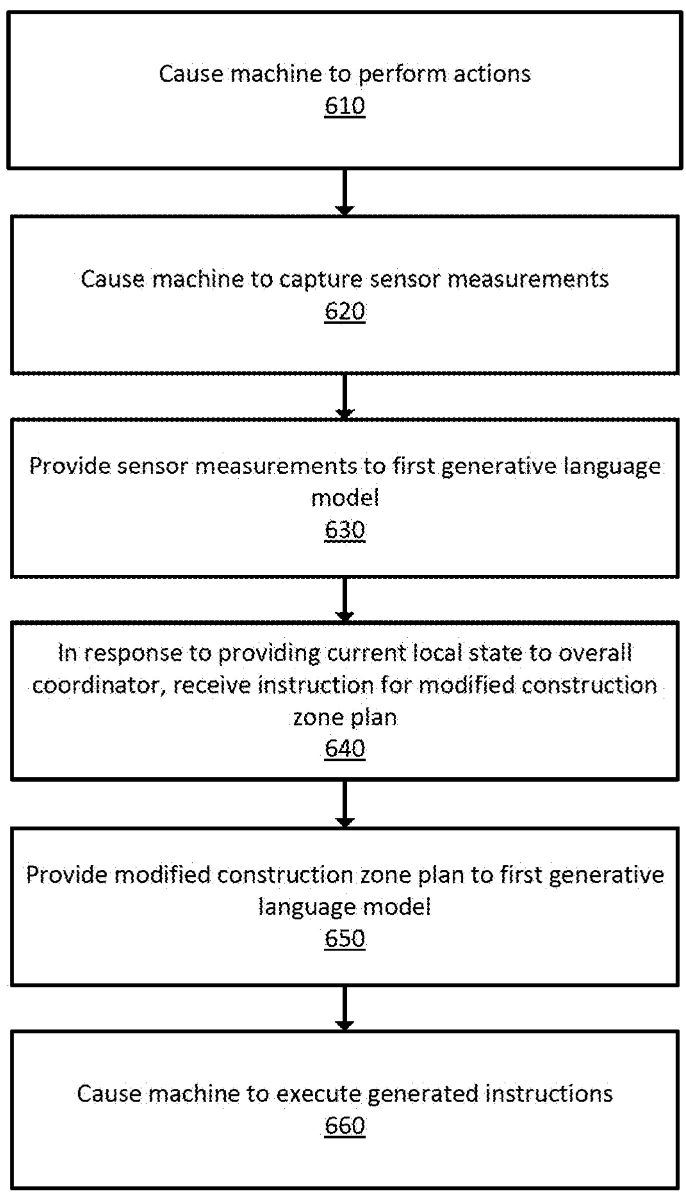
FIG. 6 is flowchart representing a method for implementing modifications to a construction zone plan, in accordance with one or more example embodiments.

FIG. 6 is flowchart representing a method 600 for implementing modifications to a construction zone plan, in accordance with one or more example embodiments. The steps of FIG. 6 are illustrated from the perspective of a local coordinator 274 (or 304) performing the method 600. However, some or all of the steps may be performed by other entities or components. In addition, some embodiments may perform the steps in parallel, perform the steps in different orders, or perform different steps.

The method 600 begins with a machine coordination model (e.g., a local coordinator 274 as an agentic AI model) causing 610 a machine in a construction zone to perform one or more actions from a construction zone plan. The machine coordination model causes 620 the machine to capture one or more sensor measurements describing the one or more actions and the construction zone. The machine coordination model provides 630 the one or more sensor measurements to a first coordination model configured to generate a data structure that represents a current local state of the machine performing the one or more actions. In response to providing the current local state of the machine to an overall coordinator model (in some embodiments, the master coordinator 302), the machine coordination model receives 640 instructions from the overall coordinator model for a modified construction zone plan. The machine coordination model provides 650, to the first coordination model, the modified construction zone plan. The first coordination model generates machine instructions that, when executed by the machine, implement the modified construction zone plan. The machine coordination model causes 660 the machine to execute the generated instructions for the modified construction zone plan.

In some embodiments, the construction plan includes one or more actions, and each action is associated with a sequence of sub-actions that, when performed by the machine in an order indicated in the sequence, cause the machine to perform the respective action. In some embodiments, the method 600 further includes generating, for each sub-action in each sequence associate with an action, a set of instructions for performing the sub-actions and causing the machine to execute the generated sets of instructions in the order indicated by the sequence. Each action may be associated with a set of alteration constraints indicative of modifications permitted for performance of the action by the machine, and each alteration constraint may be associated with a set of conditions. In response to detecting that the set of conditions of one of the alteration constraints has occurred, the machine coordination model may provide, to the first coordination model, the instructions associated with the respective action and the alteration constraints. The first coordination model may determine one or more alterations for the action within the alteration constraints. The machine coordination model receives, from the first coordination model, machine instructions that, when executed by the machine, implement the altered action. In some embodiments, the altered action is associated with a new location, speed, time of performance, or ordering from the respective action.

In some embodiments, the modified construction zone plan is provided to the first coordination model with one or more project parameters. The project parameters may include available construction materials, available construction machines, design documents, schedules of construction machines, schedules of construction workers, specifications for each available machine, operating conditions required for each available machine, and power requirements for each available machine. In some embodiments, the first coordination model is configured to interact with a set of third coordination models (e.g., additional coordinators 306), where each of the set of third coordination models has access to historical knowledge related to a respective project parameter.

In some embodiments, each local state reflects a current position of a respective machine in the construction zone, current conditions of the construction zone based on data captured by the respective machines, and positions of one or more machines or operators within a threshold range of the respective machine in the construction zone.

Figure 7:
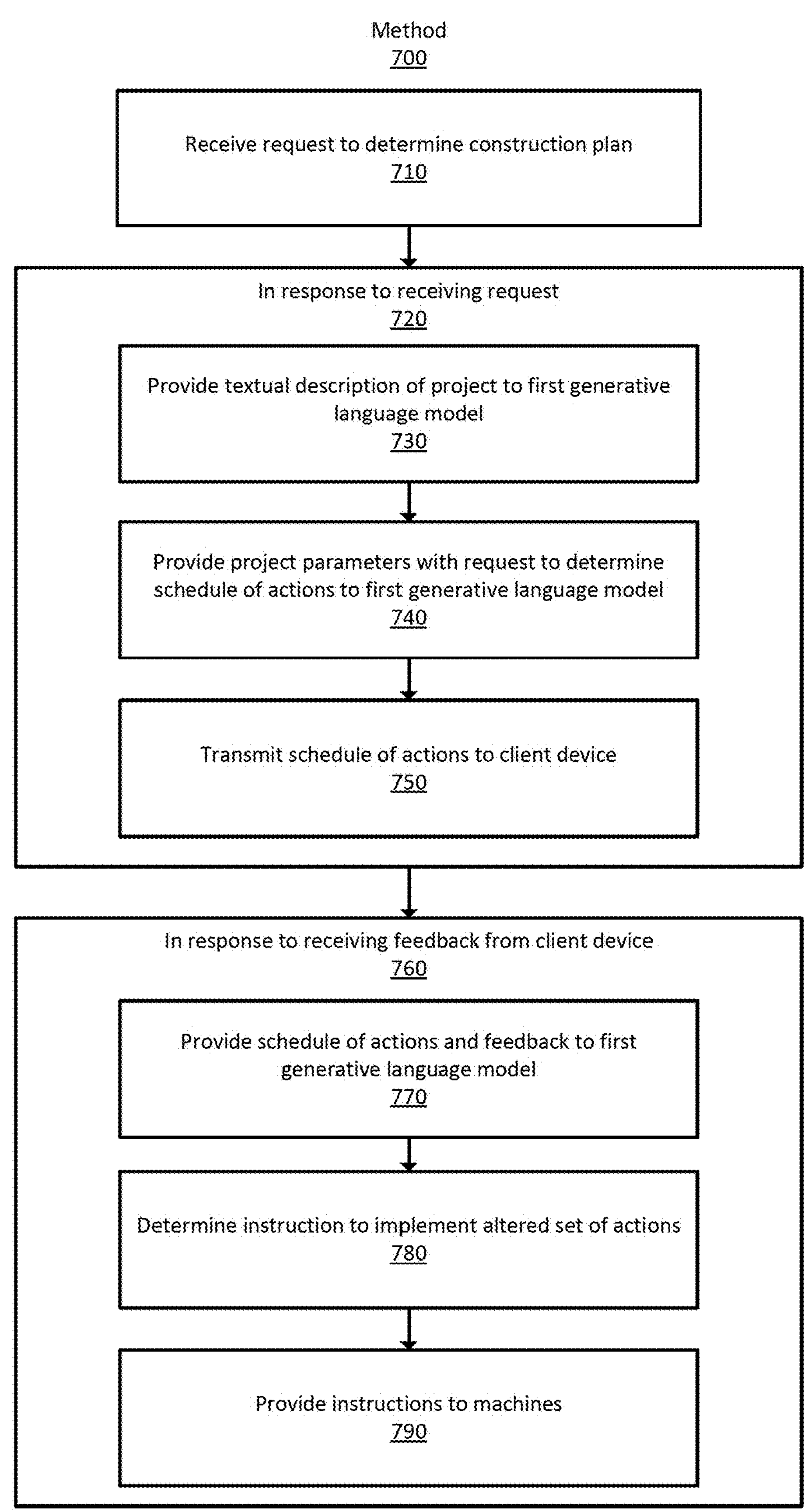
FIG. 7 is flowchart representing a method 700 for determining a schedule of actions for construction machines in a construction zone, in accordance with one or more example embodiments.

FIG. 7 is flowchart representing a method 700 for determining a schedule of actions for construction machines in a construction zone, in accordance with one or more example embodiments. The steps of FIG. 7 are illustrated from the perspective of a master coordinator 242 (or 302) performing the method 700. However, some or all of the steps may be performed by other entities or components. In addition, some embodiments may perform the steps in parallel, perform the steps in different orders, or perform different steps.

The method 700 begins with receiving 710, from a client device 270 associated with an external operator, a request to determine a construction plan for a project in the construction zone. In response to receiving the request 720, the master coordinator 242 provides 730 a textual description of the project to a first coordination model. The first coordination model is configured to determine one or more project parameters for the project, and each of the one or more project parameters providing a representation of construction resource. The master coordinator 242 provides 740, to the first coordination model (or another coordination model in some embodiments, the project parameters with a request to determine a schedule of actions to be performed by construction machines in the construction zone for the project. The master coordinator 242 transmits 750 the schedule of actions to be performed by construction machines in the construction zone for the project to the client device 270 for presentation to the external operator. In response to receiving feedback from the client device 760, the master coordinator 242 provides 770 the schedule of actions and the feedback to the first coordination model with a request to alter the schedule of actions based on the feedback. The master coordinator 242 determines 780 instructions for one or more construction machines in the construction zone to implement the altered schedule of actions and provides 790, to each of the one or more construction machines, the respective instructions to implement one or more respective actions of the schedule within the construction zone.

In some embodiments, the first coordination model is configured to interact with a set of third coordination models (e.g., additional coordinators 306), where each of the set of third coordination models has access to historical knowledge related to a respective project parameter. The master coordinator 242 may determine the altered schedule of actions by selecting a highest ranked project parameter for each action in the schedule of actions, where the ranking was determined by the first coordination model, and providing, to a respective third coordination model associated with the respective selected project parameter, a prompt requesting determination of one or more sub-actions for a construction machine associated with the action to take to complete the action. In some embodiments, each respective third coordination model outputs a sequence of sub-actions based on the respective prompt. The master coordinator 242 may generate, for each sub-action in the sequence, a set of instructions for performing the sub-actions and send, for each sub-action, the respective set of instructions to the respective construction machine. The sets of instructions may be ordered according to the sequence of associated sub-actions.

In some embodiments, the request to alter the schedule of actions based on the feedback further includes a set of alteration constraints associated with each action in the schedule. Each set of alteration constraints may be indicative of modifications permitted for the respective construction machine and the construction zone. The master coordinator 242 may determine, for at least one action of the schedule, a new location, speed, time of performance, or ordering for the at least one action.

In some embodiments, the project parameters include one or more of the following: available construction materials, available construction machines, design documents, schedules of construction machines, schedules of construction workers, specifications for each available machine, operating conditions required for each available machine, and power requirements for each available machine.

VI. Example User Interfaces

Figure 8A:
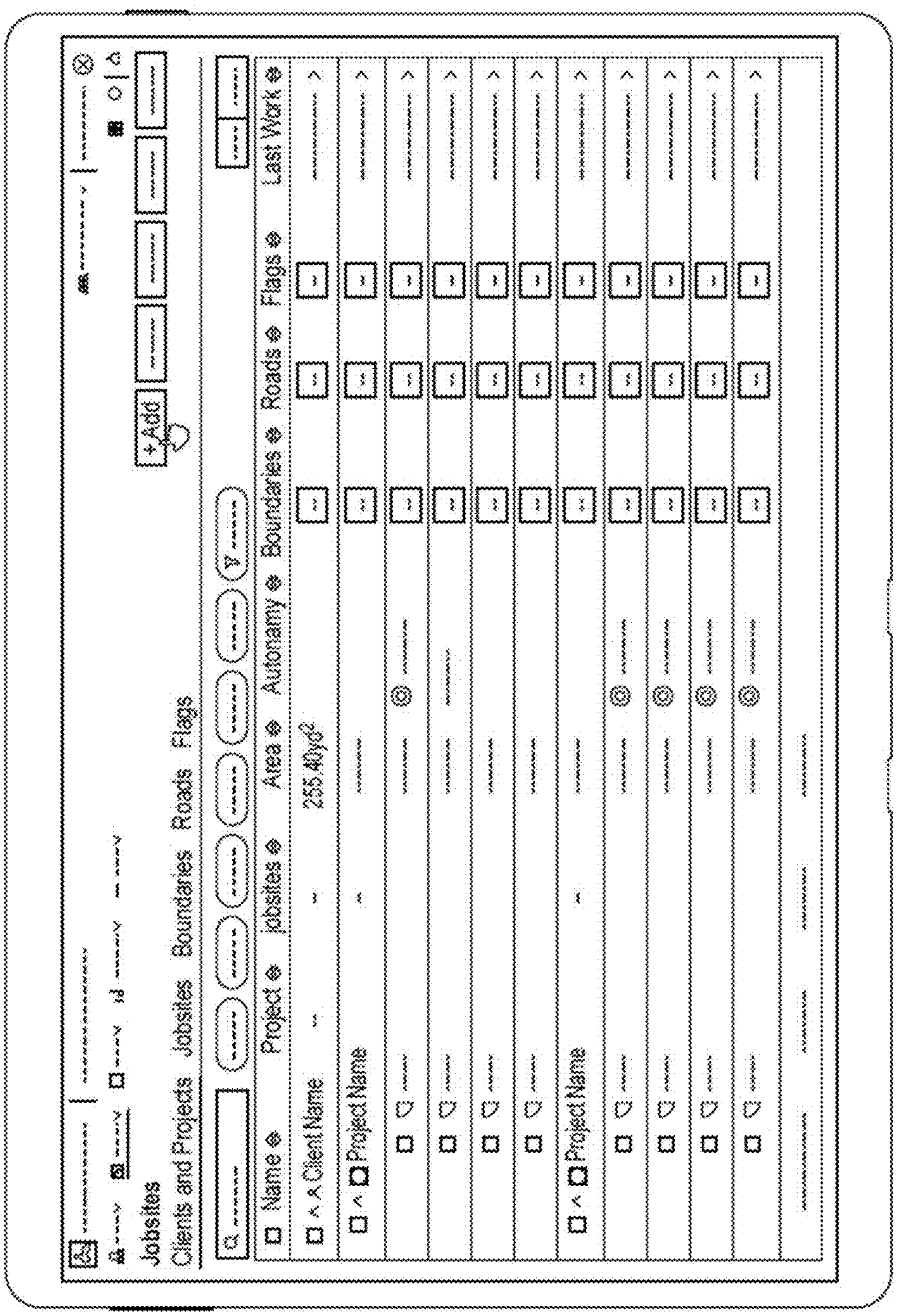
FIGS. 8A-8H illustrate example interfaces for controlling and coordinating autonomous vehicles at the jobsite, according to an example embodiment.
Figure 8B:
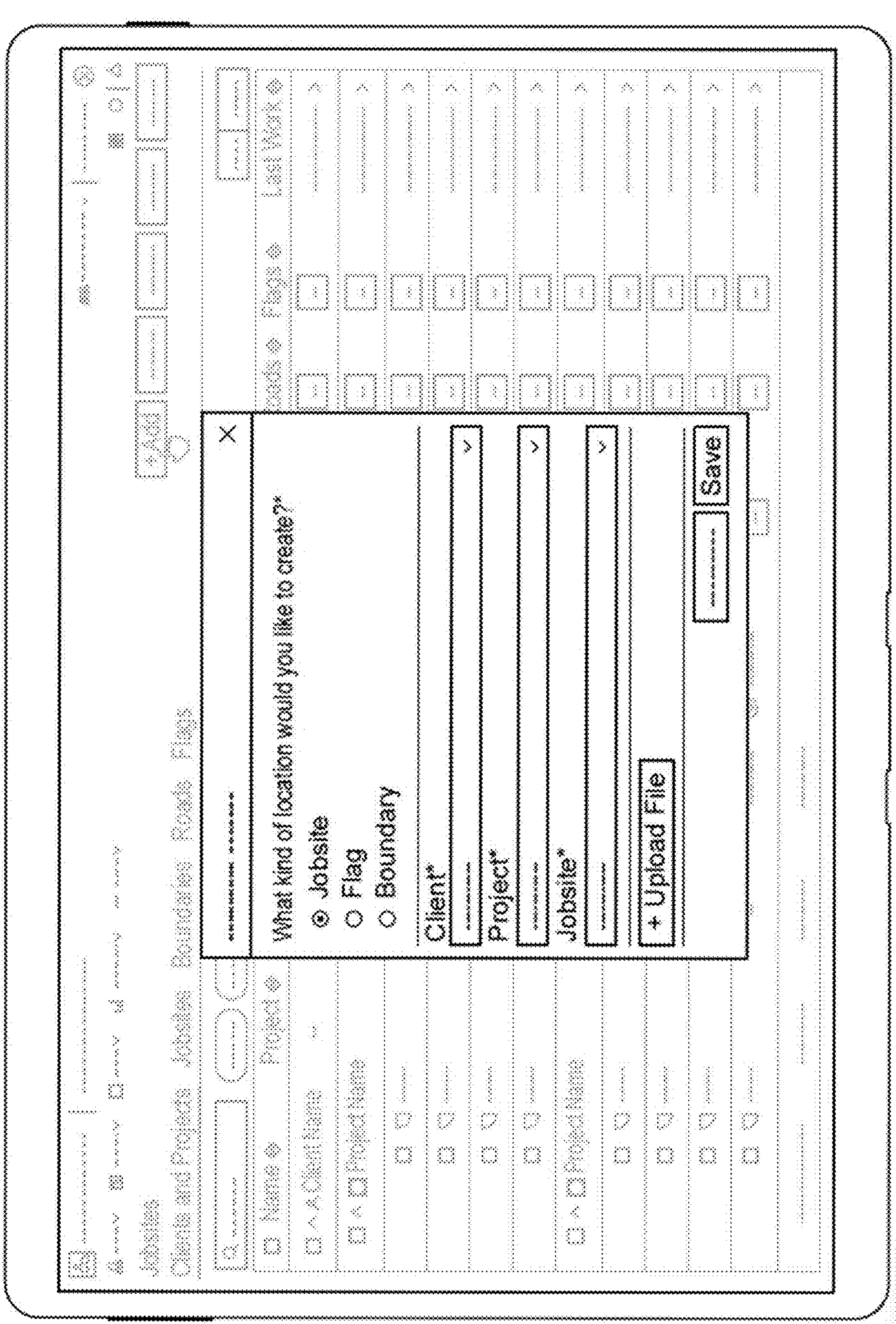

FIGS. 8A-8H illustrate example interfaces for controlling and coordinating autonomous vehicles at the jobsite, according to an example embodiment. The user interface of FIG. 8A depicts a listing of jobsites (e.g., construction zones, project locations, construction environments) with high-level data about the jobsites, including an area of each jobsite, boundaries of each jobsite, roads in each jobsite, flags (e.g., errors or alerts) in each jobsite, and a timestamp of a last instance of work completed in the jobsite. The user interface of FIG. 8B depicts interactive elements for creating a new jobsite for the list in FIG. 8A or creating flags or boundaries for one or more of the jobsites.

Figure 8C:
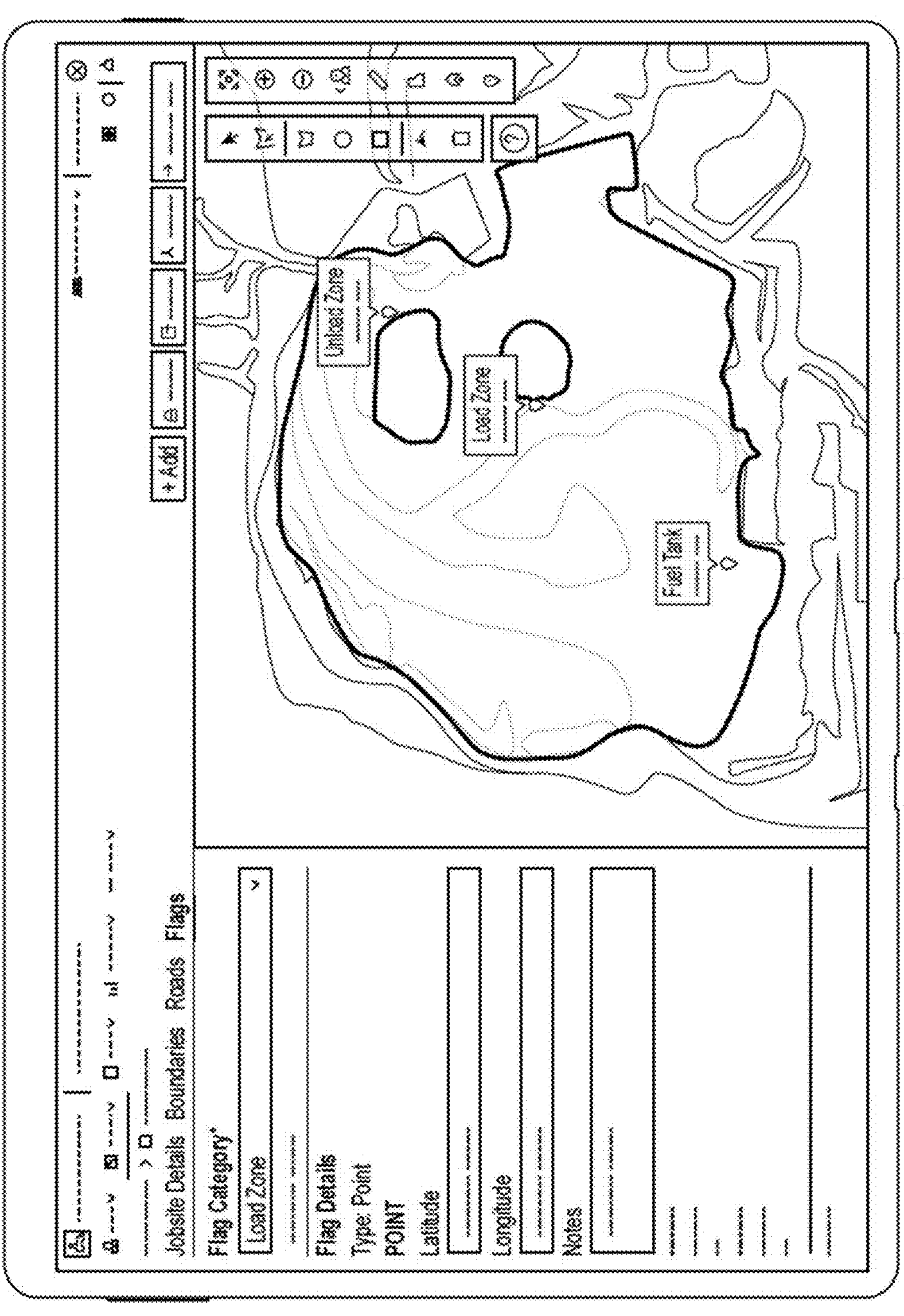
Figure 8D:
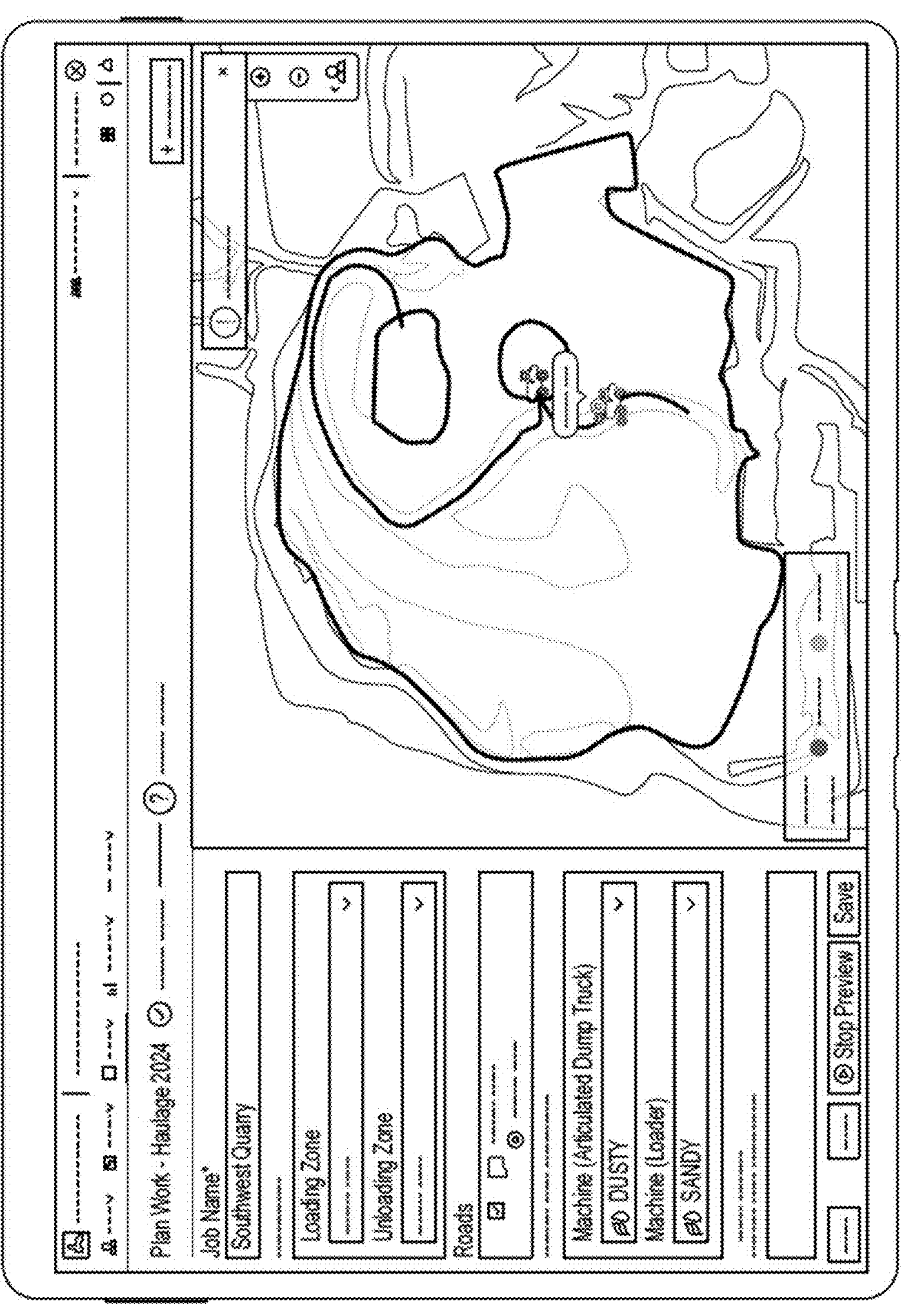

FIG. 8C depicts a user interface with a birds-eye virtual rendering of a jobsite. The virtual rendering may be overlaid with shapes and boundaries indictive of zones for particular resources or construction actions at the jobsite. In some embodiments, the virtual rendering may be in three dimensions or may be or include a heat map. The flags in this user interface may have been added to label these zones and be associated with details provided in the user interface. FIG. 8D depicts a plan to be executed at the jobsite. The plan may have been determined by the master coordinator 302 or local coordinators 304, which may have interfaced with one or more additional coordinators 306 to determine the plan. The plan includes a path of one or more machines that will perform the constructions actions for the plan and may include other data in a project guidance data structure associated with the project at the jobsite.

Figure 8E:
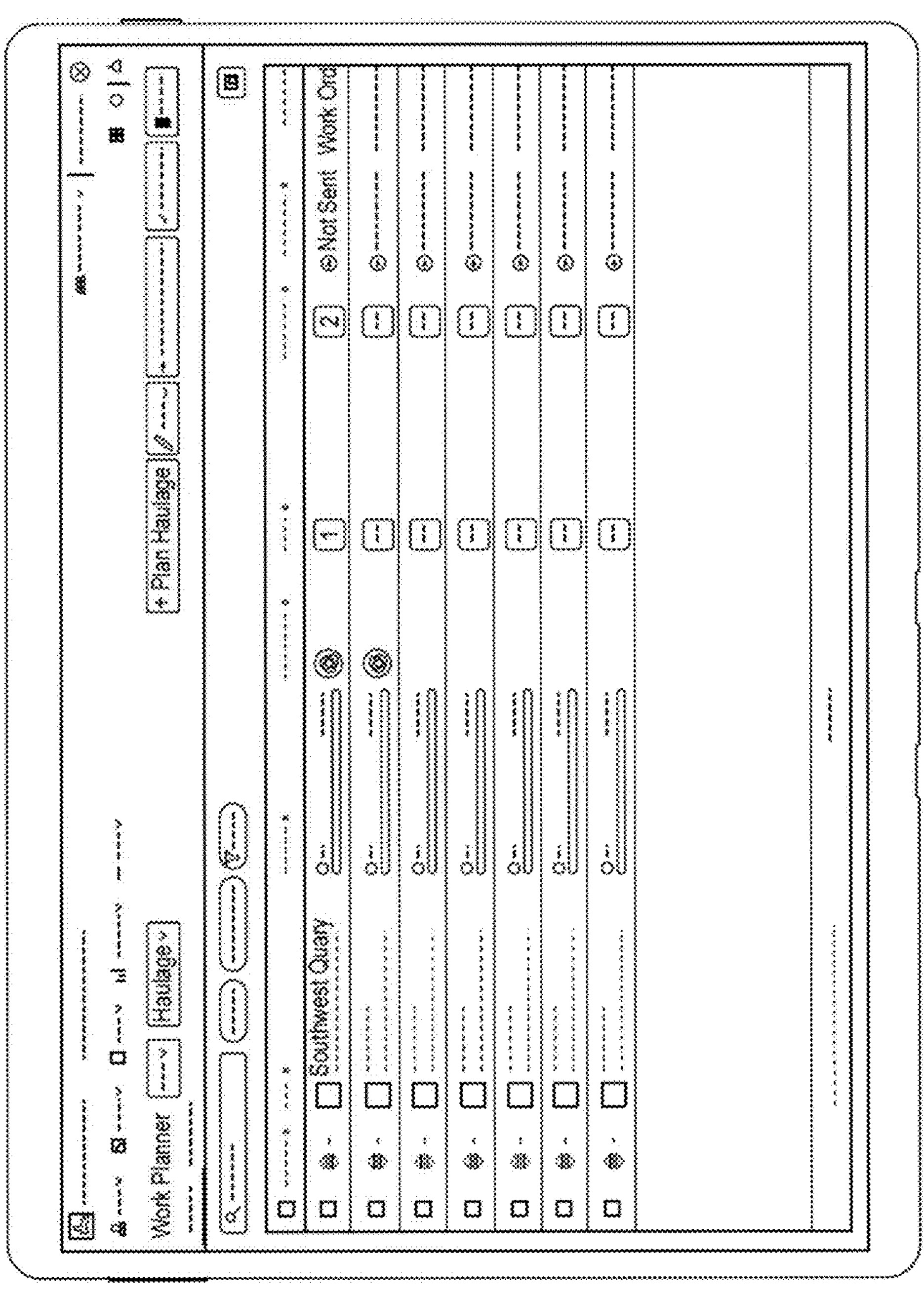
Figure 8F:
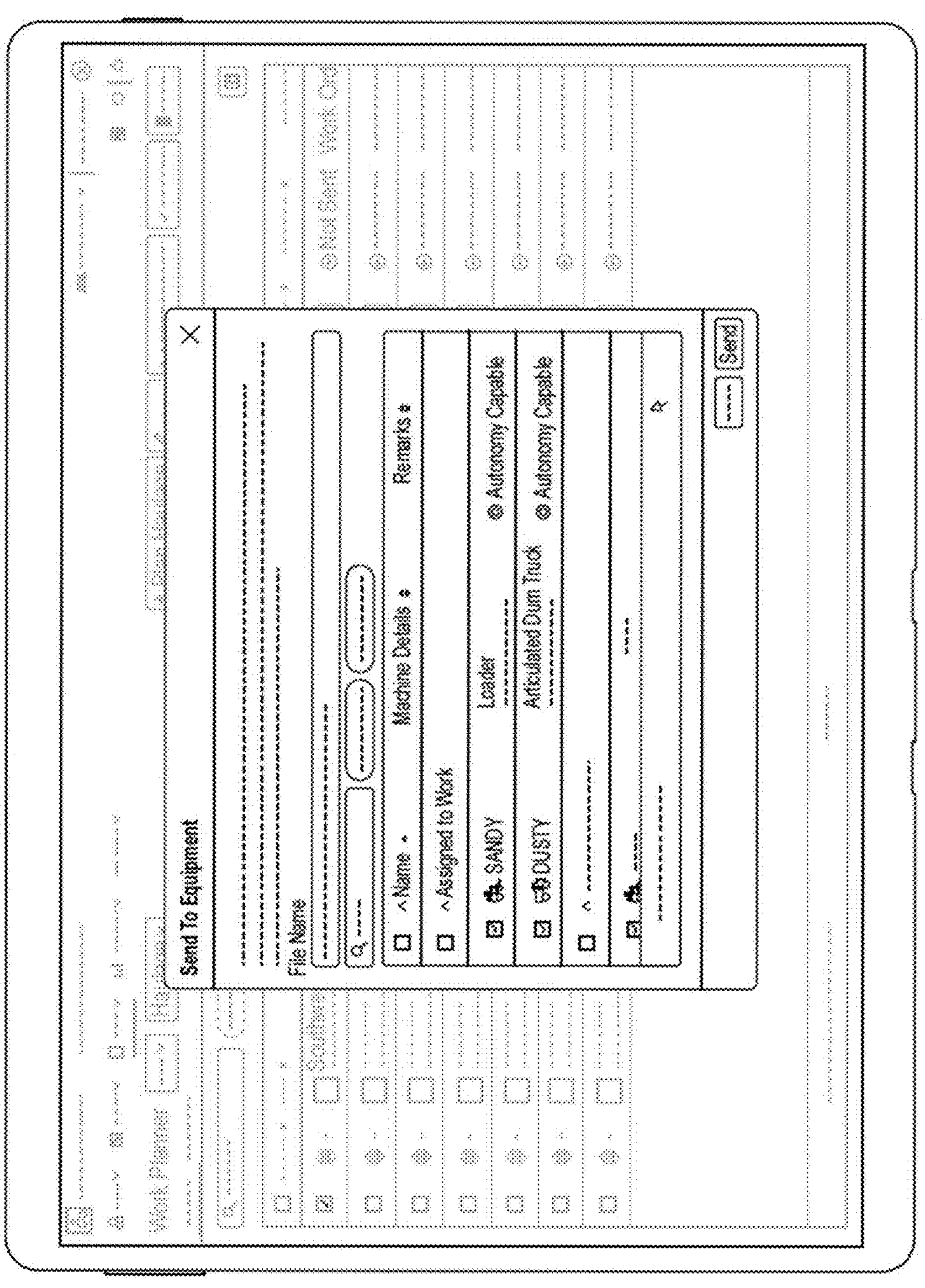
Figure 8G:
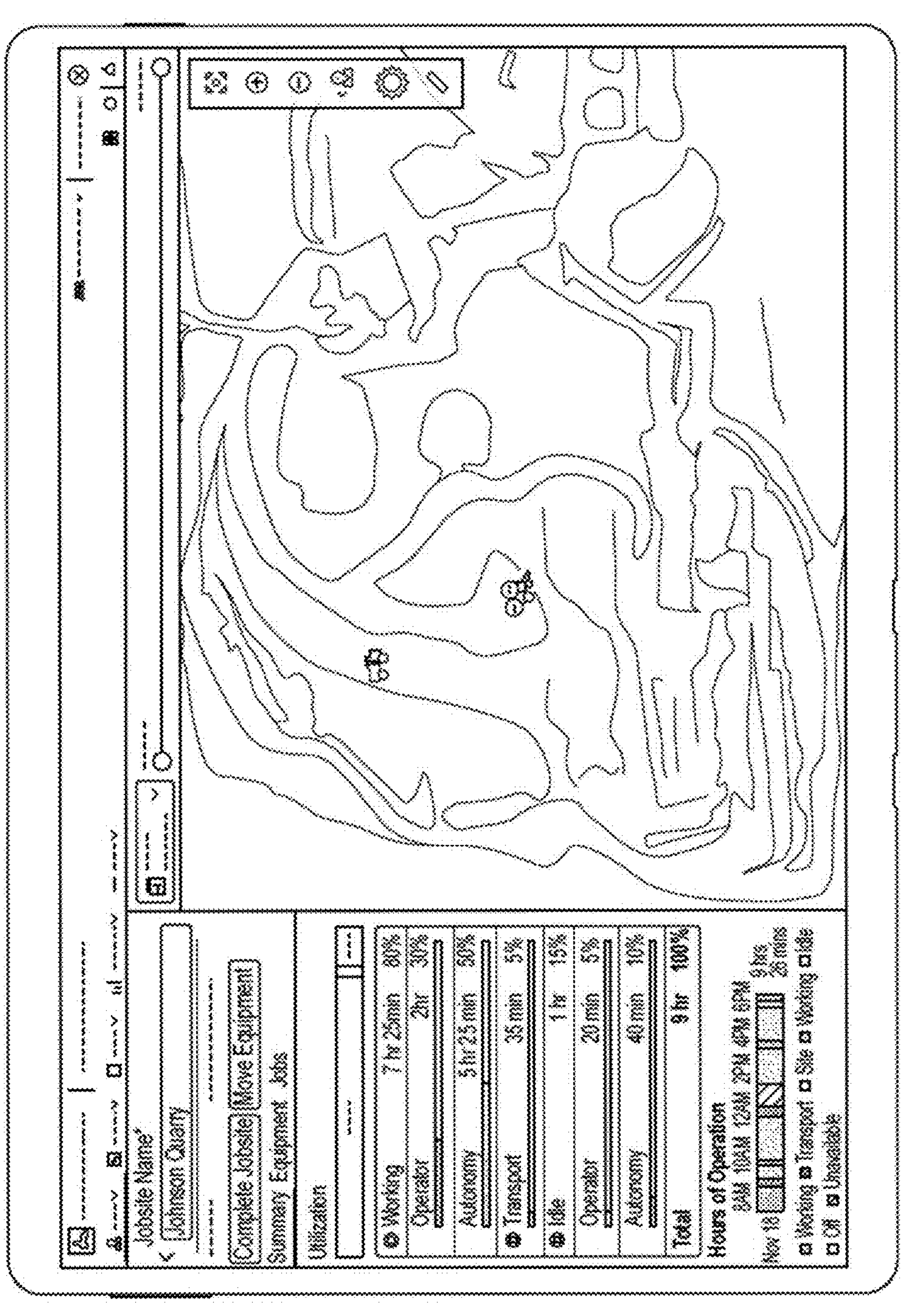
Figure 8H:
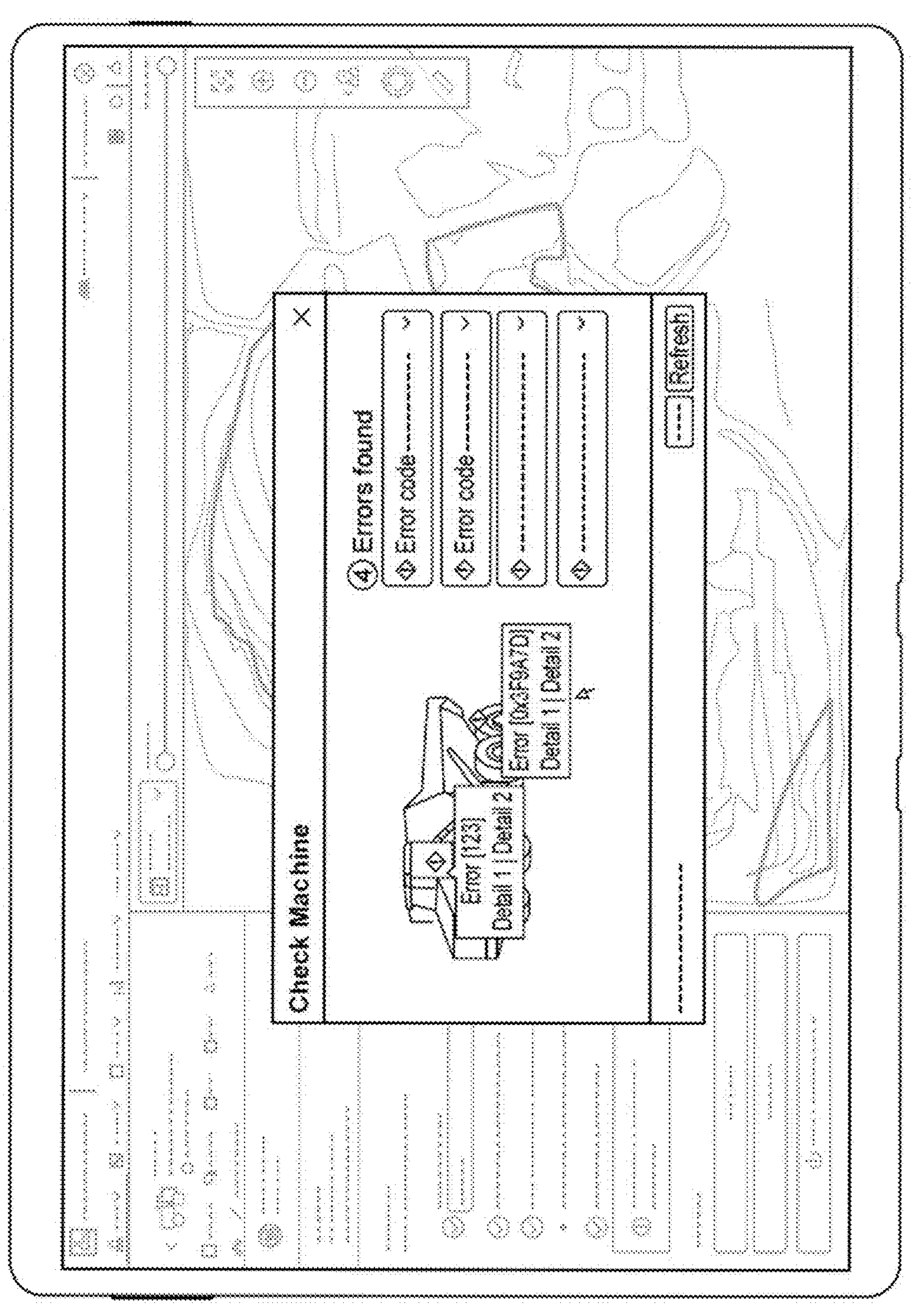

FIG. 8E illustrates a user interface listing plans assigned to or being executed at jobsites. The listing may include progress made for each plan, equipment used for each plan, and the like. FIG. 8F illustrates a user interface with interactive elements for sending construction actions to machines. The construction action(s) may have been selected from the listing and one or more machines (e.g., SANDY and DUSTY) may be selected to perform the construction action(s). FIG. 8G illustrates a user interface with a virtual rendering of the jobsite, including indications of machine positions at the jobsite. The user interface also includes metrics about the operation of the machines at the jobsite, such as utilization, an amount of autonomy being used by machines at the jobsite, idle time of workers and machines at the jobsite, and the like. These metrics may be associated with a local state of each machine, as determined by a respective local coordinator 304. In some embodiments, a machine or other resource or personnel in the jobsite may be associated with a flag indicative of an error or alert, which may cause the user interface of FIG. 8H to be displayed upon interaction with the flag. The user interface may include error codes and descriptions of errors or alters associated with a respective machine, resource, or personnel.

VII. Control System and/or Master Controller

Figure 9:
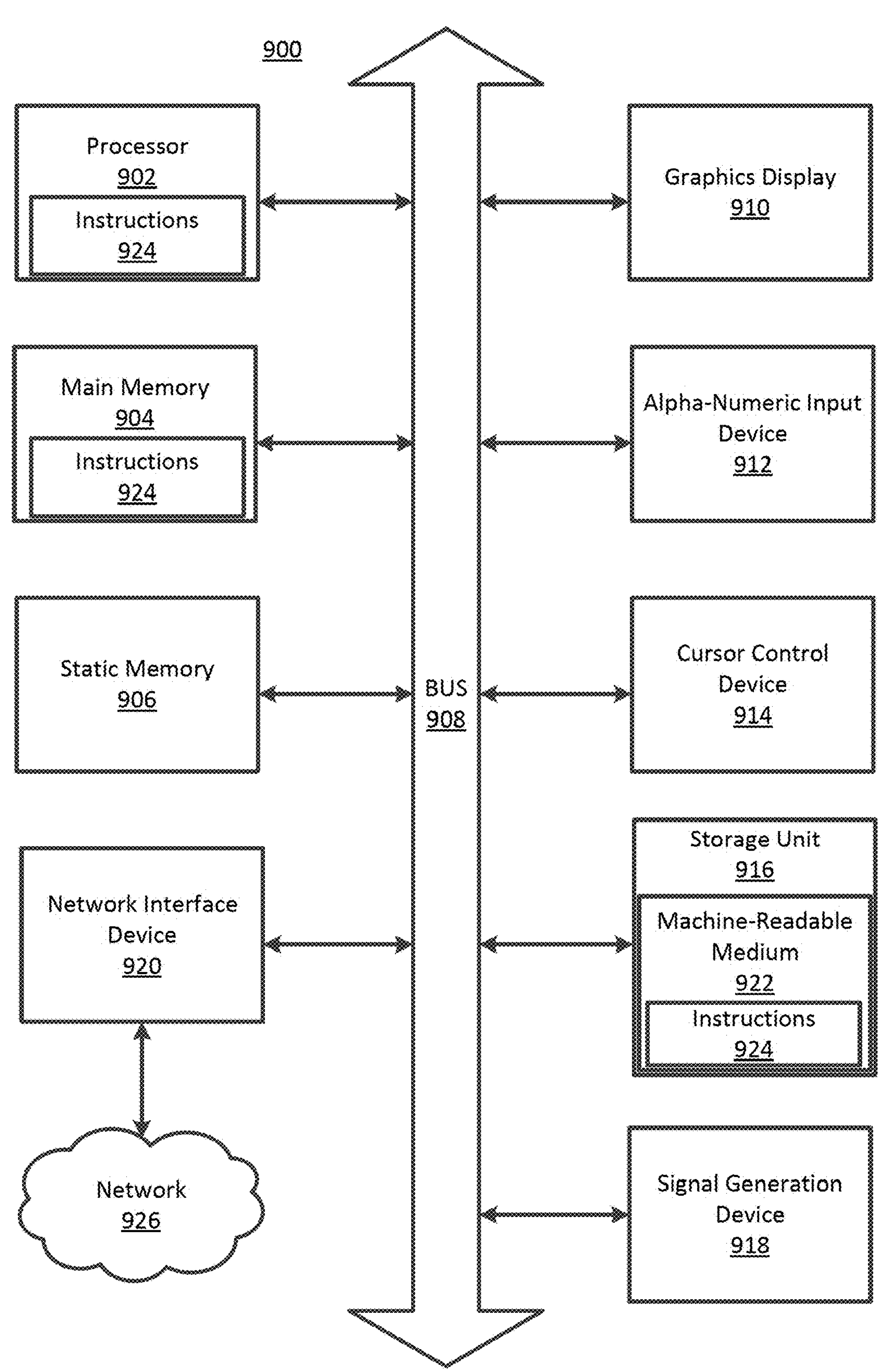
FIG. 9 illustrates a schematic of a control system, in accordance with an example embodiment.

FIG. 9 is a block diagram illustrating components of an example machine for reading and executing instructions from a machine-readable medium. Specifically, FIG. 9 shows a diagrammatic representation of control system 130 and/or master coordinator 242/302 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the control system 210 described in FIG. 2. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

VIII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for operating a vehicle in an environment with moisture including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for performing actions in a construction zone, the method comprising:

applying a local coordinator model to a construction zone plan, the local coordinator model executing locally on a machine in the construction zone and configured to:

determine one or more actions for the machine to perform in the construction zone to implement the construction zone plan;

cause the machine to capture, using one or more sensors on the machine, one or more sensor measurements describing the one or more actions and the construction zone;

generate, based on the one or more sensor measurements, a data structure that represents a current local state of the machine performing the one or more actions; and transmit the data structure to an overall coordinator model executing on a network system;

in response to transmitting the data structure to the overall coordinator model, receiving, at the local coordinator model, instructions from the overall coordinator model to implement a modified construction zone plan different from the construction zone plan;

applying the local coordination model to the modified construction zone plan, the local coordination model configured to:

determine one or more actions for the machine to perform in the construction zone to implement the modified construction zone plan; and generate machine instructions that, when executed by the machine, implement the modified construction zone plan; and executing the generated machine instructions to implement the modified construction zone plan.

2. The method of claim 1, wherein the construction plan includes one or more actions, each action associated with a sequence of sub-actions that, when performed by the machine in an order indicated in the sequence, cause the machine to perform the respective action.

3. The method of claim 2, further comprising;

generating, for each sub-action in each sequence associate with an action, a set of instructions for performing the sub-actions; and causing the machine to execute the generated sets of instructions in the order indicated by the sequence.

4. The method of claim 1, wherein each action is associated with a set of alteration constraints indicative of modifications permitted for performance of the action by the machine, each alteration constraints associated with a set of conditions, the method further comprising:

in response to detecting that the set of conditions of one of the alteration constraints has occurred, providing, to the local coordinator model, the instructions associated with the respective action and the alteration constraints, wherein the local coordinator model determines one or more alterations for the action within the alteration constraints; and receiving, from the local coordinator model, machine instructions that, when executed by the machine, implement the altered action.

5. The method of claim 4, wherein the altered action is associated with a new location, speed, time of performance, or ordering from the respective action.

6. The method of claim 1, further comprising:

providing the modified construction zone plan to the local coordinator model with one or more project resource parameters, the project resource parameters including one or more of the following:

available construction materials, available construction machines, design documents, schedules of construction machines, schedules of construction workers, specifications for each available machine, operating conditions required for each available machine, and power requirements for each available machine.

7. The method of claim 6, further comprising:

configuring the local coordinator model to interact with a set of third models each associated with a project resource parameter, wherein each of the set of third models has access to historical knowledge related to its respective project resource parameter.

8. The method of claim 1, wherein each local state reflects a current position of a respective machine in the construction zone, current conditions of the construction zone based on data captured by the respective machines, and positions of one or more machines or operators within a threshold range of the respective machine in the construction zone.

9. A non-transitory computer-readable storage medium storing instructions that, when executed, cause a processor to perform steps comprising:

applying a local coordinator model to a construction zone plan, the local coordinator model executing locally on a machine in the construction zone and configured to:

determine one or more actions for the machine to perform in the construction zone to implement the construction zone plan;

cause the machine to capture, using one or more sensors on the machine, one or more sensor measurements describing the one or more actions and the construction zone;

generate, based on the one or more sensor measurements, a data structure that represents a current local state of the machine performing the one or more actions; and transmit the data structure to an overall coordinator model executing on a network system;

in response to transmitting the data structure to the overall coordinator model, receiving, at the local coordinator model, instructions from the overall coordinator model to implement a modified construction zone plan different from the construction zone plan;

applying the local coordination model to the modified construction zone plan, the local coordination model configured to:

determine one or more actions for the machine to perform in the construction zone to implement the modified construction zone plan; and generate machine instructions that, when executed by the machine, implement the modified construction zone plan; and executing the generated machine instructions to implement the modified construction zone plan.

10. The non-transitory computer-readable storage medium of claim 9, wherein the construction plan includes one or more actions, each action associated with a sequence of sub-actions that, when performed by the machine in an order indicated in the sequence, cause the machine to perform the respective action.

11. The non-transitory computer-readable storage medium of claim 10, the steps further comprising;

generating, for each sub-action in each sequence associate with an action, a set of instructions for performing the sub-actions; and causing the machine to execute the generated sets of instructions in the order indicated by the sequence.

12. The non-transitory computer-readable storage medium of claim 9, wherein each action is associated with a set of alteration constraints indicative of modifications permitted for performance of the action by the machine, each alteration constraints associated with a set of conditions, the steps further comprising:

in response to detecting that the set of conditions of one of the alteration constraints has occurred, providing, to the local coordinator model, the instructions associated with the respective action and the alteration constraints, wherein the local coordinator model determines one or more alterations for the action within the alteration constraints; and receiving, from the local coordinator model, machine instructions that, when executed by the machine, implement the altered action.

13. The non-transitory computer-readable storage medium of claim 12, wherein the altered action is associated with a new location, speed, time of performance, or ordering from the respective action.

14. The non-transitory computer-readable storage medium of claim 9, further comprising:

providing the modified construction zone plan to the local coordinator model with one or more project resource parameters, the project resource parameters including one or more of the following:

available construction materials, available construction machines, design documents, schedules of construction machines, schedules of construction workers, specifications for each available machine, operating conditions required for each available machine, and power requirements for each available machine.

15. The non-transitory computer-readable storage medium of claim 14, further comprising:

configuring the local coordinator model to interact with a set of third models each associated with a project resource parameter, wherein each of the set of third models has access to historical knowledge related to its respective project resource parameter.

16. The non-transitory computer-readable storage medium of claim 9, wherein each local state reflects a current position of a respective machine in the construction zone, current conditions of the construction zone based on data captured by the respective machines, and positions of one or more machines or operators within a threshold range of the respective machine in the construction zone.

17. A system comprising:

a processor; and a non-transitory computer-readable storage medium storing instructions that, when executed, cause the processor to perform steps comprising:

applying a local coordinator model to a construction zone plan, the local coordinator model executing locally on a machine in the construction zone and configured to:

determine one or more actions for the machine to perform in the construction zone to implement the construction zone plan;

cause the machine to capture, using one or more sensors on the machine, one or more sensor measurements describing the one or more actions and the construction zone;

generate, based on the one or more sensor measurements, a data structure that represents a current local state of the machine performing the one or more actions; and transmit the data structure to an overall coordinator model executing on a network system;

in response to transmitting the data structure to the overall coordinator model, receiving, at the local coordinator model, instructions from the overall coordinator model to implement a modified construction zone plan different from the construction zone plan;

applying the local coordination model to the modified construction zone plan, the local coordination model configured to:

determine one or more actions for the machine to perform in the construction zone to implement the modified construction zone plan; and generate machine instructions that, when executed by the machine, implement the modified construction zone plan; and executing the generated machine instructions to implement the modified construction zone plan.

18. The system of claim 17, wherein the construction plan includes one or more actions, each action associated with a sequence of sub-actions that, when performed by the machine in an order indicated in the sequence, cause the machine to perform the respective action.

19. The system of claim 18, the steps further comprising;

generating, for each sub-action in each sequence associate with an action, a set of instructions for performing the sub-actions; and causing the machine to execute the generated sets of instructions in the order indicated by the sequence.

20. The system of claim 17, wherein each action is associated with a set of alteration constraints indicative of modifications permitted for performance of the action by the machine, each alteration constraints associated with a set of conditions, the steps further comprising:

in response to detecting that the set of conditions of one of the alteration constraints has occurred, providing, to the local coordinator model, the instructions associated with the respective action and the alteration constraints, wherein the local coordinator model determines one or more alterations for the action within the alteration constraints; and receiving, from the local coordinator model, machine instructions that, when executed by the machine, implement the altered action.

* * * * *